(12) United States Patent
Harkins

(10) Patent No.: US 10,330,364 B2
(45) Date of Patent: Jun. 25, 2019

(54) SYSTEM AND METHOD FOR RETROFITTING A REFRIGERATION SYSTEM FROM HCFC TO HFC REFRIGERANT

(71) Applicant: Hudson Technologies, Inc., Pearl River, NY (US)

(72) Inventor: Charles Harkins, Hampstead, NH (US)

(73) Assignee: Hudson Technologies, Inc., Pearl River, NY (US)

(*) Notice: Subject to any disclaimer, the term of this patent is extended or adjusted under 35 U.S.C. 154(b) by 556 days.

(21) Appl. No.: 14/744,776

(22) Filed: Jun. 19, 2015

(65) Prior Publication Data

US 2015/0377533 A1    Dec. 31, 2015

Related U.S. Application Data

(60) Provisional application No. 62/032,129, filed on Aug. 1, 2014, provisional application No. 62/017,530, filed on Jun. 26, 2014.

(51) Int. Cl.
*F25B 45/00* (2006.01)
*C09K 5/04* (2006.01)
(Continued)

(52) U.S. Cl.
CPC .............. *F25B 45/00* (2013.01); *C09K 5/045* (2013.01); *C10M 105/38* (2013.01);
(Continued)

(58) Field of Classification Search
CPC .............. C09K 5/045; C09K 2205/104; C09K 2205/22; C09K 2205/40; C10M 171/008;
(Continued)

(56) References Cited

U.S. PATENT DOCUMENTS 1,232,012 A    7/1917   Dudley et al.
2,834,748 A    5/1958   Bailey et al.
(Continued)

FOREIGN PATENT DOCUMENTS

CN    95117074         4/2002
CN    101864276 A     10/2010
(Continued)

OTHER PUBLICATIONS

Emerson Climate Technologies lvhvac.com/cope_bulletins/95-14.pdf (1995).
(Continued)

*Primary Examiner* — Frantz F Jules
*Assistant Examiner* — Martha Tadesse
(74) *Attorney, Agent, or Firm* — Tully Rinckey PLLC; Steven M. Hoffberg

(57) ABSTRACT

A system and method for retrofitting a refrigeration system containing an HCFC refrigerant and a compatible lubricant, with an HFC refrigerant, comprising providing a transport container containing a mixture of a miscible lubricant and the HFC refrigerant, removing the HCFC refrigerant from the refrigeration system while maintaining at least a portion of a lubricant immiscible with the HFC refrigerant, and charging the refrigeration system with the mixture. The polyol ester lubricant may be present in a range exceeding about 5-15% by weight, e.g., 8%.

20 Claims, 2 Drawing Sheets

(51) Int. Cl.
  *F25B 31/00* (2006.01)
  *C10M 105/38* (2006.01)
  *C10M 171/00* (2006.01)
(52) U.S. Cl.
  CPC ....... C10M 171/008 (2013.01); F25B 31/002 (2013.01); *C09K 2205/104* (2013.01); *C09K 2205/122* (2013.01); *C09K 2205/22* (2013.01); *C09K 2205/40* (2013.01); *C09K 2205/43* (2013.01); *C10M 2207/2835* (2013.01); *C10N 2220/302* (2013.01); *C10N 2220/303* (2013.01); *C10N 2240/30* (2013.01); *F25B 2345/001* (2013.01); *F25B 2345/007* (2013.01)
(58) Field of Classification Search
  CPC .......... F25B 2345/001; F25B 2345/007; F25B 31/002; F25B 45/00; C10N 2220/303
  See application file for complete search history.

(56) References Cited

U.S. PATENT DOCUMENTS

| | | |
|---|---|---|
| 2,846,458 A | 8/1958 | Haluska et al. |
| 2,889,379 A | 6/1959 | Ruh et al. |
| 2,917,480 A | 12/1959 | Bailey et al. |
| 2,931,840 A | 4/1960 | Maley et al. |
| 2,970,988 A | 2/1961 | Lo et al. |
| 3,085,918 A | 4/1963 | Raymond et al. |
| 3,384,828 A | 5/1968 | Barthelemy et al. |
| 3,723,318 A | 3/1973 | Butler et al. |
| 3,884,828 A | 5/1975 | Butler |
| 4,138,855 A | 2/1979 | Jahan et al. |
| 4,198,313 A | 4/1980 | Bargigia et al. |
| 4,272,960 A | 6/1981 | Wahl, III |
| 4,465,786 A | 8/1984 | Zimmer et al. |
| 4,482,465 A | 11/1984 | Gray |
| 4,788,352 A | 11/1988 | Smutny |
| 4,798,818 A | 1/1989 | Baizer et al. |
| 4,810,403 A | 3/1989 | Bivens et al. |
| 4,941,986 A | 7/1990 | Jolly |
| 4,944,890 A | 7/1990 | Deeb et al. |
| 5,026,497 A | 6/1991 | Merchant |
| 5,053,155 A | 10/1991 | Mahler |
| 5,080,823 A | 1/1992 | Arnaud et al. |
| 5,108,637 A | 4/1992 | Pearson |
| 5,182,040 A | 1/1993 | Bartlett et al. |
| 5,227,245 A | 7/1993 | Brands et al. |
| 5,304,320 A | 4/1994 | Barthelemy et al. |
| 5,318,716 A | 6/1994 | Bartlett et al. |
| 5,360,566 A | 11/1994 | Stevenson |
| 5,370,812 A | 12/1994 | Brown |
| 5,372,737 A * | 12/1994 | Spauschus ........... C10M 111/02 252/68 |
| 5,375,426 A * | 12/1994 | Burgener ................ F25B 45/00 62/292 |
| 5,387,357 A | 2/1995 | Shiflett et al. |
| 5,417,871 A | 5/1995 | Minor et al. |
| 5,425,890 A | 6/1995 | Yudin et al. |
| 5,458,798 A | 10/1995 | Lunger et al. |
| 5,616,275 A | 4/1997 | Chisolm et al. |
| 5,622,644 A | 4/1997 | Stevenson et al. |
| 5,624,596 A | 4/1997 | Lunger et al. |
| 5,626,790 A | 5/1997 | Minor |
| 5,648,017 A | 7/1997 | Bartlett et al. |
| 5,672,293 A | 9/1997 | Minor et al. |
| 5,685,163 A | 11/1997 | Fujita et al. |
| 5,714,083 A | 2/1998 | Turner |
| 5,785,883 A | 7/1998 | Minor et al. |
| 5,788,886 A | 8/1998 | Minor et al. |
| 5,792,383 A * | 8/1998 | Reyes-Gavilan .... C10M 129/08 252/68 |
| 5,811,603 A | 9/1998 | Elsheikh |
| 5,866,030 A * | 2/1999 | Reyes-Gavilan .... C10M 129/08 252/68 |
| 5,946,921 A * | 9/1999 | Mapes, III ............ F25B 43/003 62/77 |
| 5,954,995 A * | 9/1999 | Goble .................... C09K 5/045 252/67 |
| 5,968,406 A | 10/1999 | Bartlett et al. |
| 6,025,532 A | 2/2000 | Sage et al. |
| 6,106,740 A | 8/2000 | Powell et al. |
| 6,111,150 A | 8/2000 | Sakyu et al. |
| 6,117,356 A | 9/2000 | Powell et al. |
| 6,235,951 B1 | 5/2001 | Sakyu et al. |
| 6,258,292 B1 | 7/2001 | Turner |
| 6,316,681 B1 | 11/2001 | Yoshikawa et al. |
| 6,374,629 B1 | 4/2002 | Oberle et al. |
| 6,426,019 B1 | 7/2002 | Acharya et al. |
| 6,516,837 B2 | 2/2003 | Thomas et al. |
| 6,526,764 B1 | 3/2003 | Singh et al. |
| 6,589,355 B1 | 7/2003 | Thomas et al. |
| 6,604,368 B1 | 8/2003 | Powell et al. |
| 6,606,868 B1 | 8/2003 | Powell et al. |
| 6,629,419 B1 | 10/2003 | Powell et al. |
| 6,673,976 B1 | 1/2004 | Nair et al. |
| 6,783,691 B1 | 8/2004 | Bivens et al. |
| 6,858,571 B2 | 2/2005 | Pham et al. |
| 6,991,743 B2 | 1/2006 | Poole et al. |
| 7,157,020 B2 * | 1/2007 | Leck ....................... C09K 5/041 252/68 |
| 7,238,299 B2 | 7/2007 | Singh et al. |
| 7,258,813 B2 * | 8/2007 | Roberts .................. C09K 5/045 252/67 |
| 7,279,451 B2 | 10/2007 | Singh et al. |
| 7,341,984 B2 | 3/2008 | Wilson et al. |
| 7,442,321 B1 | 10/2008 | Chen et al. |
| 7,465,698 B2 | 12/2008 | Wilson et al. |
| 7,524,805 B2 | 4/2009 | Singh et al. |
| 7,605,117 B2 | 10/2009 | Wilson et al. |
| 7,629,306 B2 | 12/2009 | Shankland et al. |
| 7,767,638 B2 | 8/2010 | Singh et al. |
| 7,825,081 B2 | 11/2010 | Singh et al. |
| 7,829,748 B1 | 11/2010 | Tung et al. |
| 7,833,433 B2 | 11/2010 | Singh et al. |
| 7,846,355 B2 | 12/2010 | Nappa et al. |
| 7,862,742 B2 | 1/2011 | Minor et al. |
| 7,972,528 B2 | 7/2011 | Poole et al. |
| 8,008,244 B2 | 8/2011 | Knopeck et al. |
| 8,053,404 B2 | 11/2011 | Singh et al. |
| 8,101,672 B2 | 1/2012 | Hulse et al. |
| 8,148,317 B2 | 4/2012 | Singh et al. |
| 8,188,323 B2 * | 5/2012 | Leck ....................... C09K 5/045 165/62 |
| 8,444,874 B2 | 5/2013 | Singh et al. |
| 8,465,664 B2 | 6/2013 | Poole et al. |
| 8,551,354 B2 | 10/2013 | Poole et al. |
| 8,557,136 B2 | 10/2013 | Van Horn et al. |
| 9,028,707 B2 * | 5/2015 | Minor .................... C09K 5/045 252/68 |
| 9,212,549 B2 * | 12/2015 | Irani ....................... G01N 1/00 |
| 2002/0040975 A1 * | 4/2002 | Goble ..................... C09K 5/044 252/67 |
| 2002/0046568 A1 * | 4/2002 | Thomas ................. C09K 5/045 62/77 |
| 2003/0042463 A1 | 3/2003 | Arman et al. |
| 2004/0089839 A1 | 5/2004 | Thomas et al. |
| 2004/0119047 A1 | 6/2004 | Singh et al. |
| 2004/0127383 A1 | 7/2004 | Pham et al. |
| 2004/0256594 A1 | 12/2004 | Singh et al. |
| 2005/0233923 A1 | 10/2005 | Singh et al. |
| 2005/0233931 A1 | 10/2005 | Singh et al. |
| 2005/0233932 A1 | 10/2005 | Singh et al. |
| 2005/0245421 A1 | 11/2005 | Singh et al. |
| 2005/0247905 A1 | 11/2005 | Singh et al. |
| 2006/0019857 A1 | 1/2006 | Wilson et al. |
| 2006/0022166 A1 * | 2/2006 | Wilson ..................... C08J 9/144 252/68 |
| 2006/0025322 A1 | 2/2006 | Wilson et al. |
| 2006/0043331 A1 | 3/2006 | Shankland et al. |
| 2006/0058560 A1 | 3/2006 | Moscoe |
| 2006/0243944 A1 | 11/2006 | Minor et al. |
| 2006/0243945 A1 | 11/2006 | Minor et al. |

(56) References Cited

U.S. PATENT DOCUMENTS

| | | |
|---|---|---|
| 2007/0007488 A1 | 1/2007 | Singh et al. |
| 2007/0010592 A1 | 1/2007 | Bowman et al. |
| 2007/0069175 A1 | 3/2007 | Thomas et al. |
| 2007/0108403 A1 | 5/2007 | Sievert et al. |
| 2007/0210275 A1 | 9/2007 | Luly et al. |
| 2007/0210276 A1 | 9/2007 | Luly et al. |
| 2007/0290163 A1 | 12/2007 | Poole et al. |
| 2007/0290177 A1 | 12/2007 | Singh et al. |
| 2008/0069177 A1 | 3/2008 | Minor et al. |
| 2008/0075673 A1 | 3/2008 | Knopeck et al. |
| 2008/0099190 A1 | 5/2008 | Singh et al. |
| 2008/0121837 A1 | 5/2008 | Singh et al. |
| 2008/0171652 A1 | 7/2008 | Singh et al. |
| 2008/0230738 A1 | 9/2008 | Minor et al. |
| 2008/0308763 A1 | 12/2008 | Singh et al. |
| 2008/0314073 A1 | 12/2008 | Minor |
| 2009/0041677 A1 | 2/2009 | Singh et al. |
| 2009/0053695 A1 | 2/2009 | Tanigawara et al. |
| 2009/0120619 A1 | 5/2009 | Sievert et al. |
| 2009/0158771 A1 | 6/2009 | Low et al. |
| 2009/0224199 A1 | 9/2009 | Poole et al. |
| 2009/0242828 A1 | 10/2009 | Poole et al. |
| 2009/0253820 A1 | 10/2009 | Bowman et al. |
| 2009/0278076 A1 | 11/2009 | Singh et al. |
| 2009/0285764 A1 | 11/2009 | Singh et al. |
| 2009/0302285 A1 | 12/2009 | Singh et al. |
| 2009/0305876 A1 | 12/2009 | Singh et al. |
| 2010/0025619 A1 | 2/2010 | Riva et al. |
| 2010/0044619 A1 | 2/2010 | Hulse et al. |
| 2010/0048961 A1 | 2/2010 | Merkel et al. |
| 2010/0075046 A1 | 3/2010 | Hakamada et al. |
| 2010/0122545 A1* | 5/2010 | Minor .............. C08J 9/146 62/324.1 |
| 2010/0127209 A1 | 5/2010 | Singh et al. |
| 2010/0200798 A1 | 8/2010 | Rao et al. |
| 2011/0126558 A1* | 6/2011 | Thomas ............. C09K 5/045 62/77 |
| 2011/0162410 A1 | 7/2011 | Low |
| 2011/0226983 A1 | 9/2011 | Poole et al. |
| 2011/0289748 A1 | 12/2011 | Singh et al. |
| 2012/0138846 A1 | 6/2012 | Van Horn et al. |
| 2012/0145946 A1* | 6/2012 | Minor ............... C09K 5/045 252/68 |
| 2012/0187331 A1 | 7/2012 | Singh et al. |
| 2012/0282409 A1* | 11/2012 | Heidecker .......... F04B 39/121 427/401 |
| 2012/0297903 A1* | 11/2012 | Irani ................ G01N 1/00 73/864.91 |
| 2012/0312048 A1 | 12/2012 | Poole et al. |
| 2013/0075063 A1 | 3/2013 | Hulse et al. |
| 2013/0096218 A1* | 4/2013 | Rached ............. C09K 5/045 521/170 |
| 2013/0099154 A1* | 4/2013 | Boussand .......... C09K 5/045 252/68 |
| 2013/0119299 A1 | 5/2013 | Low |
| 2013/0126776 A1 | 5/2013 | Low |
| 2013/0126777 A1 | 5/2013 | Low |
| 2013/0126778 A1 | 5/2013 | Low |
| 2013/0221262 A1* | 8/2013 | Minor ............... C08J 9/146 252/2 |
| 2015/0377533 A1* | 12/2015 | Harkins ............. C09K 5/045 62/77 |

FOREIGN PATENT DOCUMENTS

| | | |
|---|---|---|
| DE | 4116274 A1 | 11/1992 |
| EP | 0398147 A2 | 11/1990 |
| EP | 0430169 A1 | 6/1991 |
| EP | 0509673 A1 | 10/1992 |
| EP | 0539952 A1 | 5/1993 |
| EP | 0565265 A1 | 10/1993 |
| EP | 0582451 A1 | 2/1994 |
| EP | 0608164 A1 | 7/1994 |
| EP | 0659862 A1 | 6/1995 |
| EP | 0720639 A1 | 7/1996 |
| EP | 0779352 A1 | 6/1997 |
| EP | 0974571 A2 | 1/2000 |
| EP | 1167894 A1 | 1/2002 |
| EP | 1193305 A1 | 4/2002 |
| EP | 1716216 A2 | 11/2006 |
| EP | 1832640 A1 | 9/2007 |
| EP | 1985680 A2 | 10/2008 |
| EP | 2036943 A2 | 3/2009 |
| EP | 2149592 A2 | 2/2010 |
| EP | 2246649 A1 | 11/2010 |
| EP | 2249104 A1 | 11/2010 |
| GB | 2007000746 | 3/2007 |
| GB | 2435747 A | 9/2007 |
| GB | 2440258 A | 1/2008 |
| JP | 04-110388 B2 | 4/1992 |
| JP | H06249551 A | 9/1994 |
| JP | H10339526 A1 | 12/1998 |
| RU | 2073058 C1 | 2/1997 |
| WO | WO1998050331 | 11/1998 |
| WO | WO2004037752 A2 | 5/2004 |
| WO | WO2004037913 A2 | 5/2004 |
| WO | WO2005042663 A1 | 5/2005 |
| WO | WO2005083028 A1 | 9/2005 |
| WO | WO2005103190 A1 | 11/2005 |
| WO | WO2005103191 A2 | 11/2005 |
| WO | WO2005103192 A1 | 11/2005 |
| WO | WO2005105947 A2 | 11/2005 |
| WO | WO2005108522 A1 | 11/2005 |
| WO | WO2005108523 A1 | 11/2005 |
| WO | WO2006094303 A2 | 9/2006 |
| WO | WO2007002625 A2 | 1/2007 |
| WO | WO2007035697 A1 | 3/2007 |
| WO | WO2007053697 A2 | 5/2007 |
| WO | WO2007099350 A1 | 9/2007 |
| WO | WO2007109748 A2 | 9/2007 |
| WO | WO2008027555 A2 | 3/2008 |
| WO | WO2008065011 A1 | 6/2008 |
| WO | WO2008076272 A2 | 6/2008 |
| WO | WO2008121776 A1 | 10/2008 |
| WO | WO2008121783 A1 | 10/2008 |
| WO | WO2008121785 A1 | 10/2008 |
| WO | WO2009047535 A2 | 4/2009 |
| WO | WO2009114397 A2 | 9/2009 |
| WO | WO2009134957 A2 | 11/2009 |
| WO | WO2009151669 A1 | 12/2009 |
| WO | WO2010000993 A2 | 1/2010 |
| WO | WO2010000994 A2 | 1/2010 |
| WO | WO2010002020 A1 | 1/2010 |
| WO | WO2010002023 A1 | 1/2010 |
| WO | WO2010056695 A2 | 5/2010 |
| WO | WO2010059677 A2 | 5/2010 |
| WO | WO2010065005 A1 | 6/2010 |
| WO | WO2010075046 A2 | 7/2010 |
| WO | WO2010088320 A1 | 8/2010 |
| WO | WO2010119265 A1 | 10/2010 |
| WO | WO2011019350 A1 | 2/2011 |

OTHER PUBLICATIONS

Dupont www2.dupont.com/Refrigerants/en_US/assets/downloads/h70004_Suva407C_retrofit_guide.pdf (2004).
Tecumseh www.air-innovations.nl/web/pdf/GUIDELINES-FOR-UTILIZATION-OF-R407C.pdf (2009).
Ennio Campagna et al., "The Use of R-4070: Applications and Guidelines", makina.beun.edu.tr/eskisite/akademik_kadro/meyriboyun/mak723/The_Use_of_R-407C.pdf (2007).
Herronhill www.heronhill.co.uk/technical-information/40/converting-r22-systems-to-r407c (2004).
Sundaresan, S. G.; Pate, M. B.; Doerr, T. M.; and Ray, D. T., "A Comparison of the Effects of POE and Mineral Oil Lubricants on the In-Tube Evaporation of R-22, R-407C and R-410A". International Refrigeration and Air Conditioning Conference. Paper 322. docs.lib.purdue.edu/iracc/322 (1996).
The News, Peter Powell, www.achrnews.com/articles/print/121529-retrofit-round-up-plenty-of-options (Dec. 3, 2012).
National Refrigerants, www.nationalref.com/pdf/R22_Alternatives.pdf (2009).

(56) References Cited

OTHER PUBLICATIONS en.wikipedia.org/wiki/List_of_refrigerants (2006-2015).
www.honeywell-refrigerants.com/india/?document=guide-to-retrofitting-ac-systems-from-r-22-to-r-422d-or-r-407c&download=1 (2012).
www2.dupont.com/Refrigerants/en_US/assets/downloads/h70004_Suva407C_retrofit_guide.pdf (2004).
opi.emersonclimate.com/CPID/GRAPHICS/Types/AEB/95-14.pdf (2013).
www.refrigerants.com/pdf/Nat-R407Broch.pdf (2008).
neilorme.com/Tecumseh%20Guidelines%20R407c.shtml http://neilorme.com/tecumsehguidelines%20for%20utilization%20of%20r407c.pdf (2009).
www.bristolcompressors.com/files/1313/5464/2815/application_bulletin_124.pdf (2003).
americas.forane.com/export/sites/forane-americas/.content/medias/downloads/literature/forane-technical-digest.pdf (2009, 2015).
users.isp.com/aschoen/refchart.pdf (2002).
International Search Report for PCT/US2015/097689 dated Nov. 26, 2015.

* cited by examiner

SYSTEM AND METHOD FOR RETROFITTING A REFRIGERATION SYSTEM FROM HCFC TO HFC REFRIGERANT

CROSS REFERENCE TO RELATED APPLICATIONS

The present application is a non-provisional of, and claims benefit of priority under 35 U.S.C. § 119(e) from U.S. Provisional Patent Application No. 62/032,129, filed Aug. 1, 2014 and from U.S. Provisional Patent Application No. 62/017,530, filed Jun. 26, 2014, the entirety of which are expressly incorporated herein by reference.

FIELD OF THE INVENTION

The present invention relates to the field of refrigerants, refrigeration systems, and refrigeration system lubricants.

BACKGROUND OF THE INVENTION

R-407C is an HFC refrigerant replacement for R-22, a HCFC refrigerant, in positive displacement systems such as new or existing residential and commercial air-conditioners and heat pumps. R-407C offers similar performance to R-22 and can be used to retrofit existing R-22 air-conditioning and refrigeration systems.

R-407C is a mixture of hydrofluorocarbons used as a refrigerant. It is a zeotropic blend of difluoromethane (R-32), pentafluoroethane (R-125), and 1,1,1,2-tetrafluoroethane (R-134a). R-32, R-125 and R-134a are present in the proportions 23%/25%/52% by weight (a ±2% tolerance is allowed for each of the components). R-407A is a mixture of 20% R32, 40% R125, and 40% R-134a, and is therefore R-407A is similar in many respects to R407C. Difluoromethane serves to provide the heat capacity, pentafluoroethane decreases flammability, tetrafluoroethane reduces pressure. R-22 is chlorodifluoromethane.

Most compressors require a lubricant to protect internal moving parts. The compressor manufacturer usually recommends the type of lubricant and proper viscosity that should be used to ensure acceptable operation and equipment durability. Recommendations are based on several criteria, which can include: lubricity; lubricant/refrigerant solubility; lubricant/refrigerant miscibility; compatibility with materials of construction; and thermal stability and compatibility with other lubricants. It is important to follow the manufacturer's recommendations for lubricants to be used with their equipment.

Lubricant return to the compressors is very important as well. One factor that affects this is the liquid-phase lubricant/refrigerant miscibility, particularly at evaporator temperatures. Miscibility is the ability of two liquids to mix and form a single liquid phase. Ideally, the lubricant-refrigerant pair have sufficient miscibility or mutual solubility to allow the lubricant to flow with the liquid refrigerant and return to the compressor in a single phase. Even if the lubricant/refrigerant pair are not miscible (two liquid phases form) in the evaporator, they may still have some degree of solubility. Solubility of refrigerant in lubricant lowers lubricant viscosity, which helps it flow through the evaporator and return to the compressor. This is why many refrigeration systems can operate properly, even though the lubricant and refrigerant are immiscible (yet partially soluble) at evaporation temperatures. Other factors, such as refrigerant vapor velocity and system geometry, play key roles in lubricant return.

Overall, it is important to note that lubricant/refrigerant miscibility is helpful, but not necessarily essential for proper system operation.

In general, R-22 and mineral oil are miscible over most of the expected ranges of operating conditions for normal air conditioning and high to medium temperature operation. Miscibility is generally believed to aid lubricant return to the compressor. The miscibility of refrigerant and lubricant is determined by several factors: the relative amounts of refrigerant and lubricant present, the temperature, the chemical makeup of the lubricant and of the refrigerant, and the viscosity of the lubricant.

Therefore, it may be desirable in a retrofit of an existing system of this type to use a miscible lubricant, such as polyol ester lubricant, with R-407C refrigerant. In general, R-407C is miscible with polyol ester (POE) lubricant and immiscible with alkylbenzene and mineral oil lubricant.

Residual mineral oil or alkylbenzene left in a refrigeration system after a retrofit to any HFC refrigerant is performed is known to decrease the lubricant/refrigerant miscibility. This is one of the reasons why three oil changes are generally recommended when a system is being converted or retrofit to use HFC refrigerants and POE lubricants. Thus, a traditional recommendation is to replace all mineral oil or alkylbenzene lubricant with POE during a retrofit.

Emerson Climate Technologies (Copeland®) provided in 1995 & 2005 the following recommendations when conducting a changeover: "Copeland's only approved lubricants for use with R-407C are Polyol ester lubricants"; "Mineral oil lubricant, such as 3GS, cannot be used as the compressor lubricant. Copeland recommends the following lubricant choices: Polyol Ester (POE)"; "The mineral oil must be removed from the compressor crankcase. Hermetic compressors will have to be removed from the piping and the lubricant drained out through the suction stub. It is advisable to do an acid test on the lubricant removed"; "Those systems that have oil separators, oil reservoirs, oil floats and suction line accumulators must have the oil drained from them. If the liquid control device is going to be replaced, it is advisable that the suction line, liquid line, and evaporator coil be blown clean using properly regulated dry nitrogen"; "POEs are very hygroscopic. They will very quickly absorb moisture from the air once the container is opened. Once the lubricant is added to the compressor, the compressor should be quickly installed. Like an open container, an open compressor with POE will absorb moisture. Add the correct amount of lubricant to the compressor. On systems using enhanced surfaces in the heat exchanger, excessive mineral oil can adversely effect the heat transfer due to logging. Therefore, it is desirable to have no more than one percent mineral oil in systems employing these types surfaces," lvhvac.com/cope_bulletins/95-14.pdf.

Dupont (2004) advises that no more than 5% mineral oil remain in the refrigeration system after a changeover from R-22 to R-407C, (www2.dupont.com/Refrigerants/en_US/assets/downloads/h70004_Suva407C_retrofit_guide.pdf)

Similarly, Tecumseh advised in 2009 (www.air-innovations.nl/web/pdf/GUIDELINES-FOR-UTILIZATION-OF-R407C.pdf):

Synthetic Lubricants: Polyol Esters (POEs) And Polyvinyl Ethers (PVEs)

A) Miscibility

1. Miscibility is the ability of the lubricant and the refrigerant to mix. This miscibility is a very important factor in providing proper heat transfer and in returning lubricant to the compressor in a refrigeration system over its range of operating temperatures.

2. R407C and Mineral oils (MO) are not miscible
3. Polyol Ester (POE) as well as Polyvinyl Ether (PVE) oils and R407C are miscible.
4. R407C and Synthetic Alkylate (SA) oils are partially miscible . . . .
C) Compatibility . . .
2. While polyol ester and polyvinyl ether oils are compatible with mineral oils, they should not be indiscriminately mixed with mineral oils in R407C refrigerant systems. This practice could result in the inability of the oil to return to the compressor and/or reduce heat transfer performance in the evaporator. However, small amounts up to 5% of mineral oil are acceptable in field retrofit situations (1% or less is preferred).

Ennio Campagna et al., "The Use of R-407C: Applications and Guidelines", makina.beun.edu.tr/eskisite/akademik_kadro/meyriboyun/mak723/The_Use_of R-407C.pdf, states:

1) General Considerations for HFC Refrigerants
Systems which use R407C normally have compressors charged with a miscible lubricant such as POE (polyolester). There are many manufacturers and grades of these lubricants. R-407C is generally not used with mineral or alkyl-benzene (i.e. hydrocarbon based) oils as the miscibility is not adequate to ensure satisfactory oil return to the compressor. It is very important that, when servicing a system and oil is needed, the correct oil be used. Seek guidance from the system or compressor manufacturer on which specific oil to use in a maintenance situation.
b) System contamination with mineral oils, or with R22, can have a serious effect on performance and system reliability. Systems which use enhanced tube heat exchangers (evaporators and condensers) are particularly vulnerable to performance degradation arising from the presence of HC based oils. It is strongly recommended that dedicated service gauge sets are used for R407C to prevent inadvertent contamination.

Similarly, Herronhill provides general guidelines to assist in the replacement of R22 condensing units with equivalent R407C units (2004, www.heronhill.co.uk/technical-information/40/converting-r22-systems-to-r407c), stating "Condensing units built and supplied by IMI Air Conditioning Ltd. (now Marstair Ltd) before 1999, for use with R22 will contain mineral oil. R407C units will contain polyolester oil (POE). Check the compressor label to confirm the type of oil in the system. For safe system operation it is essential to remove the mineral oil from the existing system, as R407C is not compatible with mineral oil. On completion of the change over the concentration of mineral oil remaining in the system should not exceed 5% of the total oil charge.

Sundaresan, S. G.; Pate, M. B.; Doerr, T. M.; and Ray, D. T., "A Comparison of the Effects of POE and Mineral Oil Lubricants on the In-Tube Evaporation of R-22, R-407C and R-410A" (1996). International Refrigeration and Air Conditioning Conference. Paper 322. docs.lib.purdue.edu/iracc/322, describe tests on the heat transfer efficiency of R-22, R-407C and R-410A on smooth and fined tubes, when neat, mixed with mineral oil, and when mixed with POE oil. POE-mineral oil mixtures were not tested. The heat transfer efficiency was higher for R-407C mixed with POE than with mineral oil.

Some more recent consideration of the choice or lubricant considers mixtures of lubricants, including mineral oil (MO) and polyol esters (POE). For example, The News, (Peter Powell, Dec. 3, 2012, www.achrnews.com/articles/print/121529-retrofit-round-up-plenty-of-options) states:

Retrofit Round-up: Plenty of Options
Because no one HFC refrigerant can be retrofitted efficiently into the entire range of R-22 equipment, a wide and sometimes changing variety of HFCs have entered the market. The NEWS contacted a number of refrigerant manufacturers asking them to discuss some of their most popular HFCs for R-22 retrofits, the range of applications, and servicing tips.
While this can provide a guideline, The NEWS urges readers to contact refrigerant manufacturers directly to discuss the specific R-22 system being considered for retrofit and what HFC refrigerants might best work in such applications. This listing is in alphanumerical order according to ASHRAE designations.
R-407A
Gus Rolotti, technical marketing director of Arkema's North American fluorochemicals business, described R-407A as a refrigerant for low- and medium-temp refrigeration. "Both R-407A and R-407C are well proven in the industry and provide good performance coupled with a lower GWP. They require the use of a POE oil." Because of that, there needs to be a change-out of the mineral oil in an existing R-22 system.
Noted Rolotti, "First, fix any leaks and identify components that may need to be replaced or fixed. Recover the R-22 completely, repair/replace any components as identified earlier and pull the system into a deep vacuum. Remove the required amount of mineral oil either by flushing with an external agent or using the R-22 from the system. Once most of the mineral oil is removed, replace it with POE oil and pull the system into a deep vacuum again. Refill with the appropriate amount of the retrofit refrigerant and run the system to set up controls and operating conditions. It is recommended that the filter drier is always replaced when the system is opened to ensure that there is fresh desiccant available to dry the system."
R-407C
Arkema's Rolotti considers R-407C a choice for air conditioning. Retrofit procedures are similar to those with R-407A refrigerant.
In his comments regarding R-407C, Ron Vogl, technical marketing manager for Honeywell Refrigerants, described it as a choice for residential and light commercial a/c applications. The retrofit process for R-407C, he said, involves recovering R-22. Then, regarding oil, Vogl said, "POE is recommended. If existing MO is used, the addition of some POE to the system is required for proper oil return." The use of the refrigerant requires a minimum of 20 percent POE for close-coupled a/c systems with no liquid receivers. No TXV change required, but minor adjustments may be needed. Replace any O-rings, seals, and other elastomers used in the system. In most air conditioning and heat pump systems this only applies to the Schrader valve seal and cap seal material. The next step is to evacuate and recharge. (Pounds of 407C=pounds of original refrigerant×70.6 divided by 73.9.) Then adjust system safety and operating controls; label system indicating refrigerant and charged lubricant.

National Refrigerants, states (date unknown, www.nationalref.com/pdf/R22_Alternatives.pdf):
Will the blends work with mineral oil?
HFC Refrigerants with Mineral Oil
They don't mix so the mineral oil will form a separate layer in the receiver or other high-side liquid hold up.

Mineral Oil will remain thick on the low side and not be returned back to the compressor.
Will the blends work with mineral oil?
Hydrocarbons (HC) in Blends
HC soaks into mineral oil and thins it so it will circulate easily around the system.
The thinned mineral oil will move easily on the low side.
The mineral oil/HC mixture will still not mix with liquid HFC on the high side of the system. A layer of oil will still form in the receiver or other liquid hold-up.
Partial POE Retrofit
Some amount of mineral oil is replaced with POE (does not require 3 flushes or less than 5% mineral oil).
The POE mixes well with the mineral oil, and the resulting mixture dissolves somewhat into liquid HFC.
The oil mixture will be carried by the liquid HFC out of the receiver.
National Refrigerants testing has shown that as little as 10% POE in mineral oil will circulate as much as an older compressor will pump out into a system.
These tests have also shown that there is very little difference in oil solubility with all of the blends on the market, regardless of the hydrocarbon content in the blend. Partial POE works with all of the blends, but hydrocarbons do not appear to help with liquid solubility of mineral oil with HFCs.

Therefore, there has been some evolution as to whether mineral oil can remain in the refrigeration system after a retrofit, with the permissible proportion of mineral oil increasing. In particular, National Refrigerants proposes a partial POE retrofit, with greater than 5% mineral oil remaining. However, the existing recommendations appear to require empirical testing for cases other than less than 5% mineral oil remaining.

See, U.S. Pat. Nos. 2,834,748; 2,846,458; 2,889,379; 2,917,480; 2,931,840; 2,970,988; 3,085,918; 3,384,828; 3,723,318; 3,884,828; 4,138,855; 4,198,313; 4,272,960; 4,465,786; 4,482,465; 4,788,352; 4,798,818; 4,810,403; 4,941,986; 4,944,890; 5,026,497; 5,053,155; 5,080,823; 5,108,637; 5,182,040; 5,227,245; 5,304,320; 5,318,716; 5,360,566; 5,370,812; 5,387,357; 5,417,871; 5,425,890; 5,458,798; 5,616,275; 5,622,644; 5,624,596; 5,626,790; 5,648,017; 5,672,293; 5,685,163; 5,714,083; 5,785,883; 5,788,886; 5,811,603; 5,968,406; 6,025,532; 6,106,740; 6,111,150; 6,117,356; 6,235,951; 6,258,292; 6,316,681; 6,374,629; 6,426,019; 6,516,837; 6,526,764; 6,589,355; 6,604,368; 6,606,868; 6,629,419; 6,673,976; 6,783,691; 6,858,571; 6,991,743; 7,238,299; 7,279,451; 7,341,984; 7,442,321; 7,465,698; 7,524,805; 7,629,306; 7,767,638; 7,825,081; 7,829,748; 7,833,433; 7,846,355; 7,862,742; 7,972,528; 8,008,244; 8,053,404; 8,101,672; 8,148,317; 8,444,874; 8,465,664; 8,551,354; 8,557,136; U.S. Published Patent Application Nos. 20020046568; 20030042463; 20040089839; 20040119047; 20040127383; 20040256594; 20050233923; 20050233931; 20050233932; 20050245421; 20050247905; 20060019857; 20060025322; 20060043331; 20060058560; 20060243944; 20060243945; 20070007488; 20070010592; 20070069175; 20070108403; 20070210275; 20070210276; 20070290163; 20070290177; 20080069177; 20080075673; 20080099190; 20080121837; 20080171652; 20080230738; 20080308763; 20080314073; 20090041677; 20090053695; 20090120619; 20090158771; 20090224199; 20090242828; 20090253820; 20090278076; 20090285764; 20090302285; 20090305876; 20100025619; 20100044619; 20100048961; 20100075046; 20100122545; 20100127209; 20100200798; 20110162410; 20110226983; 20110289748; 20120138846; 20120187331; 20120312048; 20130075063; 20130119299; 20130126776; 20130126777; 20130126778; CN101864276; CN95117074; DE4116274; EP0398147; EP0430169; EP0509673; EP0539952; EP0565265; EP0582451; EP0608164; EP0659862; EP0720639; EP0779352; EP0974571; EP1167894; EP1193305; EP1716216; EP1832640; EP1985680; EP2036943; EP2149592; EP2246649; EP2249104; GB2007000746; GB2435747; GB2440258; JP4110388; RU2073058; WO1998050331; WO2004037752; WO2004037913; WO2005042663; WO2005083028; WO2005103190; WO2005103191; WO2005103192; WO2005105947; WO2005108522; WO2005108523; WO2006094303; WO2007002625; WO2007035697; WO2007053697; WO2007099350; WO2007109748; WO2008027555; WO2008065011; WO2008076272; WO2008121776; WO2008121783; WO2008121785; WO2009047535; WO2009114397; WO2009134957; WO2009151669; WO2010000993; WO2010000994; WO2010002020; WO2010002023; WO2010056695; WO2010059677; WO2010065005; WO2010075046; WO2010088320; WO2010119265; WO2011019350; each of which is expressly incorporated herein by reference in its entirety.

SUMMARY OF THE INVENTION

The present invention provides a premixed HFC refrigerant and compatible POE lubricant, e.g., in a transport container. The amount of lubricant is selected to an amount between about 5% to 20% by weight of the refrigerant. Preferably, the amount is 8% by weight.

The amount of POE should be at least 10% of the total lubricant amount, with about 20% POE by weight of refrigerant representing the amount of POE in the absence of mineral oil.

The mixture is preferably provided in a transport container, typically DOT approved, such as a DOT-39 container.

The refrigerant-lubricant mixture is charged into the refrigeration system after recovery of the R-22 from the system, without special efforts to remove the mineral oil lubricant. Assuming that the residual mineral oil is 8-24% of the charge, and the mixed refrigerant includes 8% POE, the resulting mixture is about 25-50% of the total lubricant, and the resulting mixed lubricant is 16-32% of refrigerant charge. Therefore, the present technology provides a compromise amount of lubricant that is sufficient to provide a charge to a range of refrigeration systems to be retrofitted, without having to remove mineral oil already in the system, measure the amount of oil removed or infer the total amount, measure an amount of POE to be added to the system based on the actual amount of R-407C added to the system, or measuring mineral oil/POE ratios.

Therefore, the present technologies vastly simplify the process for retrofitting, while achieving good results. Indeed, preliminary tests show that the efficiency of an R-22 air conditioning system is improved after the retrofitting, a surprising result given that the system itself is optimized for R-22 and mineral oil.

The container may be, for example, a 10, 15, 20, 30, 40, 50, 96, 123 pound or larger container. The amount of lubricant may be, for example, 0.8, 1.2, 1.6, 2.4, 3.2, 4, 8, or 10 pounds (8% lubricant). Bulk quantities may also be provided.

The amount of POE may be varied, for example, and may be about 5%, 6%, 7%, 7.5%, 8%, 9%, 10%, 12%, 12.5%, 15%, or the like. The precision of measurement may be, for example. ±0.1%, ±0.2%, ±0.25%, ±0.3%, ±0.5%, ±0.75%, ±1%, or ±2%. Preferably, the precision is within ±0.5%.

The container may be a DOT 3, 3A, 3AA, 3AL, 3B, 3BN, 3E, 4B, 4BA, 4B240ET, 4BW, 4E, 39, steel drum, for example: DOT-3AL1800; DOT 4D; DOT-3; DOT-39; DOT-3A; DOT-3A1000; DOT-3A1200; DOT-3A150; DOT-3A1800; DOT-3A2000; DOT-3A225; DOT-3A240; DOT-3A2400; DOT-3A300; DOT-3A400; DOT-3A480; DOT-3A480X; DOT-3AA; DOT-3AA1000; DOT-3AA1200; DOT-3AA150; DOT-3AA1800; DOT-3AA2000; DOT-3AA225; DOT-3AA240; DOT-3AA2400; DOT-3AA300; DOT-3AA400; DOT-3AA480; DOT-3AAX1800; DOT-3AAX2000; DOT-3AAX2200; DOT-3AAX2400; DOT-3AL; DOT-3AL1000; DOT-3AL150; DOT-3AL1800; DOT-3AL2000; DOT-3AL225; DOT-3AL240; DOT-3AL2400; DOT-3AL400; DOT-3AL480; DOT-3AX1800; DOT-3AX2000; DOT-3AX2200; DOT-3AX2400; DOT-3B; DOT-3B150; DOT-3B1800; DOT-3B225; DOT-3B240; DOT-3B300; DOT-3B400; DOT-3BN400; DOT-3BN480; DOT-3E1800; DOT-3HT; DOT-3HT2000; DOT-3T1800; DOT-3T2000; DOT-3T2200; DOT-3T2400; DOT-4A; DOT-4AA480; DOT-4B; DOT-4B150; DOT-4B150; DOT-4B225; DOT-4B240; DOT-4B240ET; DOT-4B300; DOT-4B400; DOT-4B480; DOT-4BA; DOT-4BA225; DOT-4BA240; DOT-4BA300; DOT-4BA400; DOT-4BW; DOT-4BW225; DOT-4BW240; DOT-4BW300; DOT-4BW400; DOT-4BW480; DOT-4DA; DOT-4DS; DOT-4E225; DOT-4E240; DOT-4L; DOT-AAX2400; and ICC-3E1800.

The preferred embodiment encompasses R-407C. However, the method is more generally directed to a retrofitting of systems employing a range of refrigerants that generally require mineral oil, alkane or alkylbenzene lubricants (CFC, PCC, HCC, HCFC, CFO, HCFO), with refrigerants that generally require polymeric or oxygenated lubricants, e.g., POE, PVE (HFC, PFO) (CFC=Chlorofluorocarbon, CFO=Chlorofluoroolefin, HCFC=Hydrochlorofluorocarbon, HCFO=Hydrochlorofluoroolefin, HFC=Hydrofluorocarbon, HFO=Hydrofluoroolefin, PCC=Perchlorocarbon). See Table 1, en.wikipedia.org/wiki/List_of_refrigerants.

It is therefore an object to provide a transportable container for charging a refrigerant system, having a charging port, containing a polyol ester (POE) lubricant and a compatible HFC refrigerant in a predetermined proportion. The proportion may be at least 2%, 3%, or 5% by weight and less than 25%, 20%, or 15% by weight, and preferably 8% by weight.

It is another object to provide a composition for retrofitting an R-22 refrigeration system, comprising POE and R-407C. The POE may be present at between 2-25%, 3-20%, 5-15%, or preferably 8% by weight, with the balance substantially R-407C.

It is a further object to provide a method for retrofitting a refrigeration system from R-22 refrigerant to R-407C refrigerant, comprising evacuating the R-22 refrigerant from the refrigeration system while maintaining at least 25% of the lubricant, wherein the lubricant is not POE, and adding a premixture of POE mixed in R-407C to charge the refrigeration system. The POE may be present at between 2-25%, 3-20%, 5-15%, or preferably 8% by weight, with the balance substantially R-407C.

It is a still further object to provide a retrofit kit for an R-22 refrigeration system, comprising a DOT-approved transport container for R-407C containing a mixture of R-407C and POE, and at least one replacement seal compatible with R-407C. The POE may be present at between 2-25%, 3-20%, 5-15%, or preferably 8% by weight, with the balance substantially R-407C.

It is a still further object to provide a method for retrofitting a hermetically sealed refrigeration system from an HCFC refrigerant compatible with a mineral oil or alkyl benzene lubricant to a HFC refrigerant compatible with polyol ester lubricant, comprising: providing a transport container containing the HFC refrigerant mixed with polyol ester lubricant; withdrawing the HCFC from within the refrigeration system through a charge-discharge port, leaving at least a portion of the mineral oil or alkyl benzene lubricant; and charging the refrigeration system from the transport container with the HFC mixed with the polyol ester lubricant. The polyol ester lubricant may be present at between 2-25%, 3-20%, 5-15%, or preferably 8% by weight, with the balance substantially HFC.

Another object is to provide a method for retrofitting a system from an HCFC refrigerant compatible with a mineral oil or alkyl benzene lubricant to an HFC refrigerant compatible with a polyol ester lubricant, comprising: evacuating the HCFC from the system, leaving at least a portion of the mineral oil or alkyl benzene lubricant; and charging the refrigeration system with an HFC refrigerant mixed with a polyol ester lubricant in a predetermined ratio of 5-15% by weight.

A kit is provided for retrofitting an HCFC refrigeration system having residual mineral oil lubricant, comprising: a transport container, containing an HFC refrigerant mixed polyol ester lubricant. A kit is also provided for retrofitting an R-22 refrigeration system having residual mineral oil lubricant, comprising: a U.S. Department of Transportation certified transport container; and R-407C mixed with polyol ester lubricant. The polyol ester lubricant may be present at between 2-25%, 3-20%, 5-15%, or preferably 8% by weight. The mineral oil or alkyl benzene lubricant may be a mineral oil lubricant.

The HCFC to be replaced may comprise R-22, R-401A, R-409A, R-401B, R-409B, R-402A, R-402B, R-403B, R-408A, R-502, and/or mixtures of HCFCs, for example as provided in Table 1.

The HFC may comprise R-134a, R-404A, R-407A, R-407C, R-407F, R-410A, R-417A, R-417B, R-422A, R-422B, R-422C, R-422D, R-424A, R-427A, R-428A, R-434A, R-438A, R-442A, and RS07A, or for example, other blends of difluoromethane (R-32), pentafluoroethane (R-125), and 1,1,1,2-tetrafluoroethane (R-134a). Other HFCs or HFC blends, or HFC/HC blends, for example as provided in Table 1, may also be employed. The HFC may be a zeotropic blend.

The refrigeration system after recharging may have a concentration of about 15-32% mixed lubricant, or a concentration of about 20-25% mixed lubricant, or a concentration of about 15-25% mixed lubricant, by weight.

The transport container may be U.S. Department of Transportation compliant, e.g., DOT-39.

The metrics recited herein are intended to be interpreted according to common understanding and usage among those skilled in the art of refrigerant manufacture, distribution, and refrigeration system maintenance.

DETAILED DESCRIPTION OF THE PREFERRED EMBODIMENT

Figure 1:
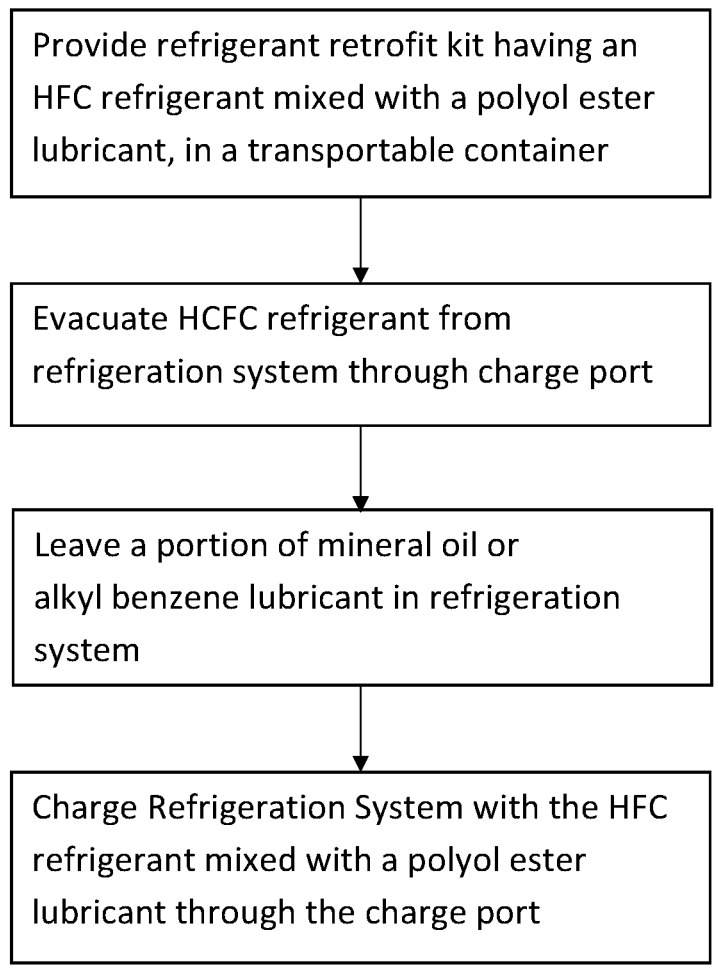
FIG. 1 shows a flowchart of a method according to the present invention.

FIG. 1 shows a flowchart of a method according to the present invention. A refrigerant retrofit kit is provided, having within a transportable container, a mixture of a refrigerant and a compatible POE lubricant. The refrigerant is typically an HFC refrigerant. The HCFC refrigerant is evacuated from a refrigeration system to be retrofit, and a portion of the existing lubricant, which is a mineral oil or alkyl benzene lubricant, is removed through the charge port of the refrigeration system, without disassembly of the system. A portion of the mineral oil or alkyl benzene lubricant remains in the refrigeration system. The refrigeration system is then charged with the mixture of the refrigerant and the compatible POE lubricant through the charge port.

Figure 2:
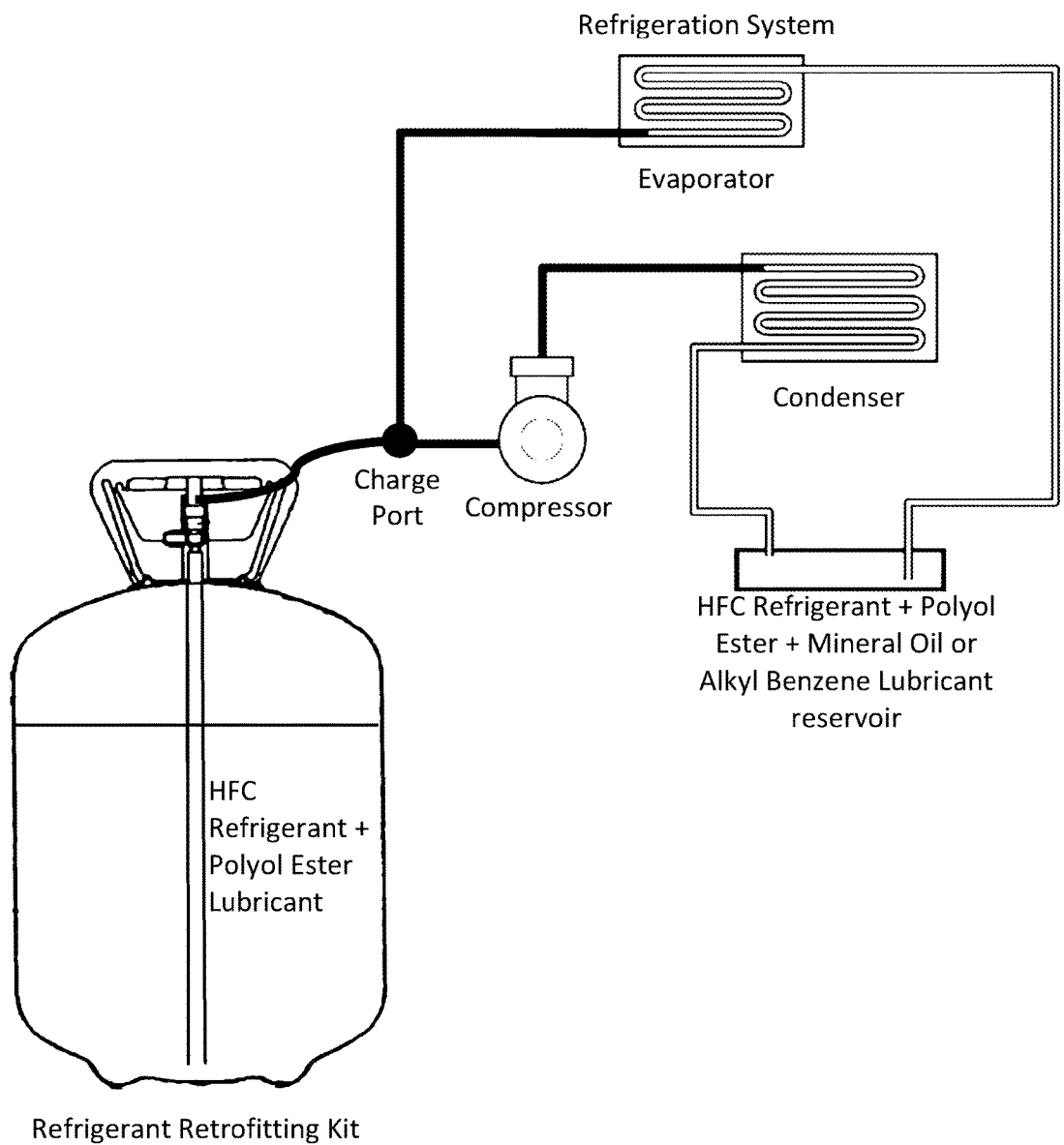
FIG. 2 shows a schematic diagram of the refrigeration system, after an HCFC refrigerant is removed, and while an HFC refrigerant and POE lubricant is being charged.

As shown in the schematic representation in FIG. 2, the refrigeration system includes a compressor, condenser and evaporator, as well as a charge port. A reservoir pools liquid refrigerant, as well as lubricants found within the system. After the HCFC refrigerant is removed from the system, a portion of the mineral oil or alkyl benzene lubricant remains in the system. During charging, the new refrigerant, typically an HFC, with a compatible POE lubricant, is drawn into the refrigeration system through the charge port, resulting in a mixed lubricant containing mineral oil or alkyl benzene lubricant and POE.

Example 1

A test was conducted of a residential air conditioning unit to determine the results of retrofitting an R-22 system with R-407C. In the test, the R-22 system, which was design and manufactured optimally for R-22, and used a mineral oil lubricant, was retrofitted with R-407C.

Instead of removing all of the mineral oil in the system, and replacing it with a defined amount of POE oil, which is required for R-407C, the R-22 was removed, and the residual mineral oil allowed to remain.

The evacuated system was recharged with a premixed quantity of R-407C with 8% by weight POE oil. Since R-407C is charged in the liquid phase, all of the oil, and most of the R-407C was transferred to the system from a transport container, e.g., DOT-39. The final POE concentration is estimated at 10-15% of the total oil in the system.

Prior to retrofitting, system was run for 13 hours over two days with the R-22 to collect the baseline data. The R-22 was then evacuated, and charged with R-407C to about 85% of the R-22 charge. The retrofitted refrigeration system with R-407C was then run for 91 hours.

The operating temperatures for R-22 (>86 F and <86 F) and R-407C (<86 F) were not the same, so performance measurements are not directly comparable, but the results support a conclusion that the R-407C does not degrade system efficiency performance.

Therefore, despite the various unknowns, including the amount of mineral oil remaining in the system, migration characteristics of the mixed lubricants around the system, the impact of the various lubricant phases on compressor lubrication, the operation of the system with R-407C was improved over the R-22 implementation.

Comparative Example 1

See: www.honeywell-refrigerants.com/india/?document=guide-to-retrofitting-ac-systems-from-r-22-to-r-422d-or-r-407c&download=1; www.honeywell.com/sites/servlet/com.merx.npoint.servlets.DocumentServlet?docid=DB0284B88-942E-B0A5-4028-CAFB85BB40AB, which are expressly incorporated herein by reference.

Comparative Examiner 2

See: www2.dupont.com/Refrigerants/en_US/assets/downloads/h70004_Suva407C_retrofit_guide.pdf, which is expressly incorporated herein by reference.

Comparative Example 3

See: opi.emersonclimate.com/CPID/GRAPHICS/Types/AEB/95-14.pdf, which is expressly incorporated herein by reference.

Comparative Example 4

See: www.refrigerants.com/pdf/Nat-R407Broch.pdf, which is expressly incorporated herein by reference.

Comparative Example 5

See: neilorme.com/Tecumseh%20Guidelines%20R407c.shtml, which is expressly incorporated herein by reference.

Comparative Example 6

See: www.bristolcompressors.com/files/1313/5464/2815/application_bulletin_124.pdf, which is expressly incorporated herein by reference.

Comparative Example 7

See: americas.forane.com/export/sites/forane-americas/.content/medias/downloads/literature/forane-technical-digest.pdf, which is expressly incorporated herein by reference.

Although the present system and/or approach has been described with respect to at least one illustrative example, many variations and modifications will become apparent to those skilled in the art upon reading the specification. It is therefore the intention that the appended claims be interpreted as broadly as possible in view of the related art to include all such variations and modifications.

TABLE 1

| Type | ASHRAE Number | IUPAC Name | Molecular Formula | CAS Number |
|---|---|---|---|---|
| CFC | R-211 | 1,1,1,2,2,3,3-Heptachloro-3-fluoropropane | $C_3FCl_7$ | 422-78-6 |
| CFC | R-112a | 1,1,1,2-Tetrachloro-2,2-difluoroethane | $C_2F_2Cl_4$ | 76-11-9 |
| CFC | R-213 | 1,1,1,3,3-Pentachloro-2,2,3-trifluoropropane | $C_3F_3Cl_5$ | 6/5/2354 |

TABLE 1-continued

| Type | ASHRAE Number | IUPAC Name | Molecular Formula | CAS Number |
|---|---|---|---|---|
| CFC | R-215 | 1,1,1-Trichloro-2,2,3,3,3-pentafluoropropane | $C_3F_5Cl_3$ | 4259-43-2 |
| CFC | R-113a | 1,1,1-Trichlorotrifluoroethane | $C_2F_3Cl_3$ | 354-58-5 |
| CFC | R-112 | 1,1,2,2-Tetrachloro-1,2-difluoroethane | $C_2F_2Cl_4$ | 76-12-0 |
| CFC | R-113 | 1,1,2-Trichlorotrifluoroethane | $C_2F_3Cl_3$ | 76-13-1 |
| CFC | R-114a | 1,1-Dichlorotetrafluoroethane | $C_2F_4Cl_2$ | 374-07-2 |
| CFC | R-214 | 1,2,2,3-Tetrachloro-1,1,3,3-tetrafluoropropane | $C_3F_4Cl_4$ | 2268-46-4 |
| CFC | R-216 | 1,2-Dichloro-1,1,2,3,3,3-hexafluoropropane | $C_3F_6Cl_2$ | 661-97-2 |
| CFC | R-114 | 1,2-Dichlorotetrafluoroethane | $C_2F_4Cl_2$ | 76-14-2 |
| CFC | R-216ca | 1,3-Dichloro-1,1,2,2,3,3-hexafluoropropane | $C_3F_6Cl_2$ | 662-01-1 |
| CFC | R-217 | 1-Chloro-1,1,2,2,3,3,3-heptafluoropropane | $C_3F_7Cl$ | 422-86-6 |
| CFC | R-217ba | 2-Chloro-1,1,1,2,3,3,3-heptafluoropropane | $C_3F_7Cl$ | 76-18-6 |
| CFC | R-C317 | Chloroheptafluorocyclobutane | $C_4ClF_7$ | 377-41-3 |
| CFC | R-115 | Chloropentafluoroethane | $C_2F_5Cl$ | 76-15-3 |
| CFC | R-13 | Chlorotrifluoromethane | $CClF_3$ | 75-72-9 |
| CFC | R-12 | Dichlorodifluoromethane | $CCl_2F_2$ | 75-71-8 |
| CFC | R-C316 | Dichlorohexafluorocyclobutane | $C_4Cl_2F_6$ | 356-18-3 |
| CFC | R-212 | Hexachlorodifluoropropane | $C_3F_2Cl_6$ | 76546-99-3 |
| CFC | R-111 | Pentachlorofluoroethane | $C_2FCl_5$ | 354-56-3 |
| CFC | R-400 | R-/114(50/50 wt %) OR (60/40)(must be specified) | 50% $CCl_2F_2$•50% $C_2F_4Cl_2$ OR 60% $CCl_2F_2$•40% $C_2F_4Cl_2$ | |
| CFC | R-11 | Trichlorofluoromethane | $CCl_3F$ | 75-69-4 |
| CFO | R-1112a | 1,1-Dichloro-2,2-difluoroethylene | $C_2Cl_2F_2$ | 79-35-6 |
| CFO | R-1113 | Chlorotrifluoroethylene | $C_2ClF_3$ | 79-38-9 |
| HCC | R-130a | 1,1,1,2-Tetrachloroethane | $C_2H_2Cl_4$ | 630-20-6 |
| HCC | R-140a | 1,1,1-Trichloroethane (Methyl chloroform) | $C_2H_3Cl_3$ or $CH_3CCl_3$ | 71-55-6 |
| HCC | R-130 | 1,1,2,2-Tetrachloroethane | $C_2H_2Cl_4$ | 79-34-5 |
| HCC | R-140 | 1,1,2-Trichloroethane | $C_2H_3Cl_3$ | 79-00-5 |
| HCC | R-150a | 1,1-Dichloroethane | $C_2H_4Cl_2$ | 75-34-3 |
| HCC | R-150 | 1,2-Dichloroethane | $C_2H_4Cl_2$ | 107-06-2 |
| HCC | R-160 | Chloroethane (ethyl chloride) | $C_2H_5Cl$ | 75-00-3 |
| HCC | R-20 | Chloroform (Trichloromethane) | $CHCl_3$ | 67-66-3 |
| HCC | R-40 | Chloromethane | $CH_3Cl$ | 74-87-3 |
| HCC | R-30 | Dichloromethane (Methylene chloride) | $CH_2Cl_2$ | 75-09-2 |
| HCC | R-120 | Pentachloroethane | $C_2HCl_5$ | 76-01-7 |
| HCFC | R-221 | 1,1,1,2,2,3-Hexachloro-3-fluoropropane | $C_3HFCl_6$ | 422-26-4 |
| HCFC | R-121a | 1,1,1,2-Tetrachloro-2-fruoroethane | $C_2HFCl_4$ | 354-11-0 |
| HCFC | R-222c | 1,1,1,3,3-Pentachloro-2,2-difluoropropane | $C_3HF_2Cl_5$ | 422-49-1 |
| HCFC | R-223cb | 1,1,1,3-Tetrachloro-2,2,3-trifluoropropane | $C_3HF_3Cl_4$ | 422-50-4 |
| HCFC | R-232cb | 1,1,1,3-Tetrachloro-2,2-difluoropropane | $C_3H_2F_2Cl_4$ | 677-54-3 |
| HCFC | R-224cc | 1,1,1-Trichloro-2,2,3,3-tetrafluoropropane | $C_3HF_4Cl_3$ | 422-51-5 |
| HCFC | R-233cc | 1,1,1-Trichloro-2,2,3-trifluoropropane | $C_3H_2F_3Cl_3$ | 131211-71-7 |
| HCFC | R-122b | 1,1,1-Trichloro-2,2-difluoroethane | $C_2HF_2Cl_3$ | 354-12-1 |
| HCFC | R-131b | 1,1,1-Trichloro-2-fruoroethane | $C_2H_2FCl_3$ | 2366-36-1 |
| HCFC | R-121 | 1,1,2,2-Tetrachloro-1-fluoroethane | $C_2HFCl_4$ | 354-14-3 |
| HCFC | R-122a | 1,1,2-Trichloro-1,2-difluoroethane | $C_2HF_2Cl_3$ | 354-15-4 |
| HCFC | R-131a | 1,1,2-Trichloro-1-fluoroethane | $C_2H_2FCl_3$ | 811-95-0 |
| HCFC | R-122 | 1,1,2-Trichloro-2,2-difluoroethane | $C_2HF_2Cl_3$ | 354-21-2 |
| HCFC | R-131 | 1,1,2-Trichloro-2-fruoroethane | $C_2H_2FCl_3$ | 359-28-4 |
| HCFC | R-223ca | 1,1,3,3-Tetrachloro-1,2,2-trifluoropropane | $C_3HF_3Cl_4$ | 422-52-6 |
| HCFC | R-232ca | 1,1,3,3-Tetrachloro-2,2-difluoropropane | $C_3H_2F_2Cl_4$ | 1112-14-7 |
| HCFC | R-224cb | 1,1,3-Trichloro-1,2,2,3-tetrafluoropropane | $C_3HF_4Cl_3$ | 422-53-7 |
| HCFC | R-233cb | 1,1,3-Trichloro-1,2,2-trifluoropropane | $C_3H_2F_3Cl_3$ | 421-99-8 |
| HCFC | R-233ca | 1,1,3-Trichloro-2,2,3-trifluoropropane | $C_3H_2F_3Cl_3$ | 131221-36-8 |
| HCFC | R-225cc | 1,1-Dichloro-1,2,2,3,3-pentafluoropropane | $C_3HF_5Cl_2$ | 13474-88-9 |
| HCFC | R-234cd | 1,1-Dichloro-1,2,2,3-tetrafluoropropane | $C_3H_2F_4Cl_2$ | 70192-63-1 |
| HCFC | R-123b | 1,1-Dichloro-1,2,2-trifluoroethane | $C_2HF_3Cl_2$ | 812-04-4 |
| HCFC | R-243cc | 1,1-Dichloro-1,2,2-trifluoropropane | $C_3H_3F_3Cl_2$ | 7125-99-7 |
| HCFC | R-225eb | 1,1-Dichloro-1,2,3,3,3-pentafluoropropane | $C_3HF_5Cl_2$ | 111512-56-2 |
| HCFC | R-132c | 1,1-Dichloro-1,2-difluoroethane | $C_2H_2F_2Cl_2$ | 1842-05-3 |
| HCFC | R-252ec | 1,1-Dichloro-1,2-difluoropropane | $C_3H_4F_2Cl_2$ | |
| HCFC | R-234fb | 1,1-Dichloro-1,3,3,3-tetrafluoropropane | $C_3H_2F_4Cl_2$ | 64712-27-2 |
| HCFC | R-141b | 1,1-Dichloro-1-fluoroethane | $C_2H_3FCl_2$ | 1717-00-6 |
| HCFC | R-234cb | 1,1-Dichloro-2,2,3,3-tetrafluoropropane | $C_3H_2F_4Cl_2$ | 1/6/4071 |
| HCFC | R-243cb | 1,1-Dichloro-2,2,3-trifluoropropane | $C_3H_3F_3Cl_2$ | 70192-70-0 |
| HCFC | R-132a | 1,1-Dichloro-2,2-difluoroethane | $C_2H_2F_2Cl_2$ | 471-43-2 |
| HCFC | R-252cb | 1,1-Dichloro-2,2-difluoropropane | $C_3H_4F_2Cl_2$ | 1112-01-2 |
| HCFC | R-141a | 1,1-Dichloro-2-fluoroethane | $C_2H_3FCl_2$ | 430-53-5 |
| HCFC | R-225bb | 1,2-Dichloro-1,1,2,3,3-pentafluoropropane | $C_3HF_5Cl_2$ | 422-44-6 |
| HCFC | R-234bc | 1,2-Dichloro-1,1,2,3-tetrafluoropropane | $C_3H_2F_4Cl_2$ | 149329-26-0 |
| HCFC | R-123a | 1,2-Dichloro-1,1,2-trifluoroethane | $C_2HF_3Cl_2$ | 354-23-4 |
| HCFC | R-225da | 1,2-Dichloro-1,1,3,3,3-pentafluoropropane | $C_3HF_5Cl_2$ | 431-86-7 |
| HCFC | R-132b | 1,2-Dichloro-1,1-difluoroethane | $C_2H_2F_2Cl_2$ | 1649-08-7 |

TABLE 1-continued

| Type | ASHRAE Number | IUPAC Name | Molecular Formula | CAS Number |
|---|---|---|---|---|
| HCFC | R-252dc | 1,2-Dichloro-1,1-difluoropropane | $C_3H_4F_2Cl_2$ | |
| HCFC | R-234ba | 1,2-Dichloro-1,2,3,3-tetrafluoropropane | $C_3H_2F_4Cl_2$ | 425-94-5 |
| HCFC | R-141 | 1,2-Dichloro-1-fluoroethane | $C_2H_3FCl_2$ | 430-57-9 |
| HCFC | R-261ba | 1,2-Dichloro-2-fluoropropane | $C_3H_5FCl_2$ | 420-97-3 |
| HCFC | R-224ca | 1,3,3-Trichloro-1,1,2,2-tetrafluoropropane | $C_3HF_4Cl_3$ | 422-54-8 |
| HCFC | R-225cb | 1,3-Dichloro-1,1,2,2,3-pentafluoropropane | $C_3HF_5Cl_2$ | 507-55-1 |
| HCFC | R-234cc | 1,3-Dichloro-1,1,2,2-tetrafluoropropane | $C_3H_2F_4Cl_2$ | 422-00-5 |
| HCFC | R-225ea | 1,3-Dichloro-1,1,2,3,3-pentafluoropropane | $C_3HF_5Cl_2$ | 136013-79-1 |
| HCFC | R-243ec | 1,3-Dichloro-1,1,2-trifluoropropane | $C_3H_3F_3Cl_2$ | 149329-27-1 |
| HCFC | R-234fa | 1,3-Dichloro-1,1,3,3-tetrafluoropropane | $C_3H_2F_4Cl_2$ | 76140-39-1 |
| HCFC | R-234ca | 1,3-Dichloro-1,2,2,3-tetrafluoropropane | $C_3H_2F_4Cl_2$ | 70341-81-0 |
| HCFC | R-243ca | 1,3-Dichloro-1,2,2-trifluoropropane | $C_3H_3F_3Cl_2$ | 67406-68-2 |
| HCFC | R-243ea | 1,3-Dichloro-1,2,3-trifluoropropane | $C_3H_3F_3Cl_2$ | 151771-08-3 |
| HCFC | R-252ca | 1,3-Dichloro-2,2-difluoropropane | $C_3H_4F_2Cl_2$ | 1112-36-3 |
| HCFC | R-226cb | 1-Chloro-1,1,2,2,3,3-hexafluoropropane | $C_3HF_6Cl$ | 422-55-9 |
| HCFC | R-235cc | 1-Chloro-1,1,2,2,3-pentafluoropropane | $C_3H_2F_5Cl$ | 679-99-2 |
| HCFC | R-124a | 1-Chloro-1,1,2,2-tetrafluoroethane | $C_2HF_4Cl$ | 354-25-6 |
| HCFC | R-244cc | 1-Chloro-1,1,2,2-tetrafluoropropane | $C_3H_3F_4Cl$ | 421-75-0 |
| HCFC | R-226ea | 1-Chloro-1,1,2,3,3,3-hexafluoropropane | $C_3HF_6Cl$ | 359-58-0 |
| HCFC | R-244ec | 1-Chloro-1,1,2,3-tetrafluoropropane | $C_3H_3F_4Cl$ | |
| HCFC | R-133b | 1-Chloro-1,1,2-Trifluoroethane | $C_2H_2F_3Cl$ | 421-04-5 |
| HCFC | R-253ec | 1-Chloro-1,1,2-trifluoropropane | $C_3H_4F_3Cl$ | |
| HCFC | R-235fa | 1-Chloro-1,1,3,3,3-pentafluoropropane | $C_3H_2F_5Cl$ | 677-55-4 |
| HCFC | R-244fb | 1-Chloro-1,1,3,3-tetrafluoropropane | $C_3H_3F_4Cl$ | 2730-64-5 |
| HCFC | R-253fc | 1-Chloro-1,1,3-trifluoropropane | $C_3H_4F_3Cl$ | |
| HCFC | R-142b | 1-Chloro-1,1-difluoroethane | $C_2H_3F_2Cl$ | 75-68-3 |
| HCFC | R-235ca | 1-Chloro-1,2,2,3,3-pentafluoropropane | $C_3H_2F_5Cl$ | 28103-66-4 |
| HCFC | R-244cb | 1-Chloro-1,2,2,3-tetrafluoropropane | $C_3H_3F_4Cl$ | 67406-66-0 |
| HCFC | R-133 | 1-Chloro-1,2,2-Trifluoroethane | $C_2H_2F_3Cl$ | 431-07-2 |
| HCFC | R-253cb | 1-Chloro-1,2,2-trifluoropropane | $C_3H_4F_3Cl$ | 70192-76-6 |
| HCFC | R-253eb | 1-Chloro-1,2,3-trifluoropropane | $C_3H_4F_3Cl$ | |
| HCFC | R-142a | 1-Chloro-1,2-difluoroethane | $C_2H_3F_2Cl$ | 25497-29-4 |
| HCFC | R-262fb | 1-Chloro-1,3-difluoropropane | $C_3H_5F_2Cl$ | |
| HCFC | R-151a | 1-Chloro-1-fluoroethane | $C_2H_4ClF$ | 1615-75-4 |
| HCFC | R-271fb | 1-Chloro-1-fluoropropane | $C_3H_6FCl$ | |
| HCFC | R-133a | 1-Chloro-2,2,2-Trifluoroethane | $C_2H_2F_3Cl$ | 75-88-7 |
| HCFC | R-253ca | 1-Chloro-2,2,3-trifluoropropane | $C_3H_4F_3Cl$ | 56758-54-4 |
| HCFC | R-262ca | 1-Chloro-2,2-difluoropropane | $C_3H_5F_2Cl$ | 420-99-5 |
| HCFC | R-225aa | 2,2-Dichloro-1,1,1,3,3-pentafluoropropane | $C_3HF_5Cl_2$ | 128903-21-9 |
| HCFC | R-234ab | 2,2-Dichloro-1,1,1,3-tetrafluoropropane | $C_3H_2F_4Cl_2$ | 149329-24-8 |
| HCFC | R-123 | 2,2-Dichloro-1,1,1-trifluoroethane | $C_2HF_3Cl_2$ | 306-83-2 |
| HCFC | R-234aa | 2,2-Dichloro-1,1,3,3-tetrafluoropropane | $C_3H_2F_4Cl_2$ | 17705-30-5 |
| HCFC | R-225ba | 2,3-Dichloro-1,1,1,2,3-pentafluoropropane | $C_3HF_5Cl_2$ | 422-48-0 |
| HCFC | R-234bb | 2,3-Dichloro-1,1,1,2-tetrafluoropropane | $C_3H_2F_4Cl_2$ | 149329-25-9 |
| HCFC | R-234da | 2,3-Dichloro-1,1,1,3-tetrafluoropropane | $C_3H_2F_4Cl_2$ | 146916-90-7 |
| HCFC | R-243da | 2,3-Dichloro-1,1,1-trifluoropropane | $C_3H_3F_3Cl_2$ | 338-75-0 |
| HCFC | R-226ba | 2-Chloro-1,1,1,2,3,3-hexafluoropropane | $C_3HF_6Cl$ | 51346-64-6 |
| HCFC | R-124 | 2-Chloro-1,1,1,2-tetrafluoroethane | $C_2HF_4Cl$ | 2837-89-0 |
| HCFC | R-244bb | 2-Chloro-1,1,1,2-tetrafluoropropane | $C_3H_3F_4Cl$ | 421-73-8 |
| HCFC | R-226da | 2-Chloro-1,1,1,3,3,3-hexafluoropropane | $C_3HF_6Cl$ | 431-87-8 |
| HCFC | R-235da | 2-Chloro-1,1,1,3,3-pentafluoropropane | $C_3H_2F_5Cl$ | 134251-06-2 |
| HCFC | R-244db | 2-Chloro-1,1,1,3-tetrafluoropropane | $C_3H_3F_4Cl$ | 117970-90-8 |
| HCFC | R-253bb | 2-Chloro-1,1,2-trifluoropropane | $C_3H_4F_3Cl$ | |
| HCFC | R-244da | 2-Chloro-1,1,3,3-tetrafluoropropane | $C_3H_3F_4Cl$ | 19041-02-2 |
| HCFC | R-244ba | 2-Chloro-1,2,3,3-tetrafluoropropane | $C_3H_3F_4Cl$ | |
| HCFC | R-253ba | 2-Chloro-1,2,3-trifluoropropane | $C_3H_4F_3Cl$ | |
| HCFC | R-271d | 2-Chloro-1-fluoropropane | $C_3H_6FCl$ | |
| HCFC | R-271b | 2-Chloro-2-fluoropropane | $C_3H_6FCl$ | 420-44-0 |
| HCFC | R-225ca | 3,3-Dichloro-1,1,1,2,2-pentafluoropropane | $C_3HF_5Cl_2$ | 422-56-0 |
| HCFC | R-226ca | 3-Chloro-1,1,1,2,2,3-hexafluoropropane | $C_3HF_6Cl$ | 422-57-1 |
| HCFC | R-235cb | 3-Chloro-1,1,1,2,3-pentafluoropropane | $C_3H_2F_5Cl$ | 422-02-6 |
| HCFC | R-244eb | 3-Chloro-1,1,1,2-tetrafluoropropane | $C_3H_3F_4Cl$ | |
| HCFC | R-244fa | 3-Chloro-1,1,1,3-tetrafluoropropane | $C_3H_3F_4Cl$ | |
| HCFC | R-253fb | 3-Chloro-1,1,1-trifluoropropane | $C_3H_4F_3Cl$ | 460-35-5 |
| HCFC | R-244ca | 3-Chloro-1,1,2,2-tetrafluoropropane | $C_3H_3F_4Cl$ | 679-85-6 |
| HCFC | R-244ea | 3-Chloro-1,1,2,3-tetrafluoropropane | $C_3H_3F_4Cl$ | |
| HCFC | R-253ea | 3-Chloro-1,1,2-trifluoropropane | $C_3H_4F_3Cl$ | |
| HCFC | R-262fa | 3-Chloro-1,1-difluoropropane | $C_3H_5F_2Cl$ | |
| HCFC | R-253fa | 3-Chloro-1,3,3-trifluoropropane | $C_3H_4F_3Cl$ | |
| HCFC | R-142 | Chlorodifluoroethane | $C_2H_3F_2Cl$ | 25497-29-4 |
| HCFC | R-22 | Chlorodifluoromethane | $CHClF_2$ | 75-45-6 |
| HCFC | R-262 | Chlorodifluoropropane | $C_3H_5F_2Cl$ | 134190-53-7 |
| HCFC | R-151 | Chlorofluoroethane | $C_2H_4ClF$ | 110587-14-9 |
| HCFC | R-31 | Chlorofluoromethane | $CH_2FCl$ | 593-70-4 |
| HCFC | R-271 | Chlorofluoropropane | $C_3H_6FCl$ | 134190-54-8 |
| HCFC | R-226 | Chlorohexafluoropropane | $C_3HF_6Cl$ | 134308-72-8 |
| HCFC | R-235 | Chloropentafluoropropane | $C_3H_2F_5Cl$ | 134237-41-5 |

TABLE 1-continued

| Type | ASHRAE Number | IUPAC Name | Molecular Formula | CAS Number |
|---|---|---|---|---|
| HCFC | R-244 | Chlorotetrafluoropropane | $C_3H_3F_4Cl$ | 134190-50-4 |
| HCFC | R-253 | Chlorotrifluoropropane | $C_3H_4F_3Cl$ | 134237-44-8 |
| HCFC | R-132 | Dichlorodifluoroethane | $C_2H_2F_2Cl_2$ | 25915-78-0 |
| HCFC | R-252 | Dichlorodifluoropropane | $C_3H_4F_2Cl_2$ | 134190-52-6 |
| HCFC | R-21 | Dichlorofluoromethane | $CHFCl_2$ | 75-43-4 |
| HCFC | R-261 | Dichlorofluoropropane | $C_3H_5FCl_2$ | 134237-45-9 |
| HCFC | R-225 | Dichloropentafluoropropane | $C_3HF_5Cl_2$ | 127564-92-5 |
| HCFC | R-234 | Dichlorotetrafluoropropane | $C_3H_2F_4Cl_2$ | 127564-83-4 |
| HCFC | R-243 | Dichlorotrifluoropropane | $C_3H_3F_3Cl_2$ | 134237-43-7 |
| HCFC | R-222 | Pentachlorodifluoropropane | $C_3HF_2Cl_5$ | 134237-36-8 |
| HCFC | R-231 | Pentachlorofluoropropane | $C_3H_2FCl_5$ | 134190-48-0 |
| HCFC | R-500 | R-/152a (73.8/26.2) | 73.8%•$CCl_2F_2$•26.2% $C_2H_4F_2$ | Carrene #7[2] |
| HCFC | R-505 | R-/31 (78/22) | 78% $CCl_2F_2$•22% $CH_2FCl$ | |
| HCFC | R-408A | R-/143a/22 (7 ± 2/46 ± 1/47 ± 2) | 7 ± 2% $C_2HF_5$•46 ± 2% $C_2H_3F_3$•47 ± 2% $CHClF_2$ | FX-10[2][1] |
| HCFC | R-402B | R-/290/22 (38 ± 2/2 ± 1/60 ± 2) | 38 ± 2% $C_2HF_5$•2 ± 1% $C_3H_8$•60 ± 2% $CHClF_2$ | HP-81[2][1] |
| HCFC | R-402A | R-/290/22 (60 ± 2/2 ± 1/38 ± 2) | 60 ± 2% $C_2HF_5$•2 ± 1% $C_3H_8$•38 ± 2% $CHClF_2$ | HP-80[2][1] |
| HCFC | R-416A | R-a/124/600 (59 + .5-1/39.5 + 1, −.5/1.5 + 1, −.2) | 59 + .5, −1% $C_2H_2F_4$•39.5 + 1, −.5% $C_2HF_4Cl$•1.5 + 1, −.2% $C_4H_{10}$ | FRIGC (FR-)[2] |
| HCFC | R-420A | R-a/142b (88 + 1, −0/12 + 0, −1) | 88 + 1, −0% $C_2H_2F_4$•12 + 0, −1% $C_2H_3F_2Cl$ | Choice Refrigerant[1] |
| HCFC | R-502 | R-/115(48.8/51.2) | 48.8% $CHClF_2$•51.2% $C_2F_5Cl$ | |
| HCFC | R-501 | R-/12 (75/25) | 75% $CHClF_2$•25% $CCl_2F_2$ | |
| HCFC | R-409A | R-/124/142b (60 ± 2/25 ± 2/15 ± 1) | 60 ± 2% $CHClF_2$•25 ± 2% $C_2HF_4Cl$•15 ± 1% $C_2H_3F_2Cl$ | FX-56[2][1] |
| HCFC | R-409B | R-/124/142b (65 ± 2/25 ± 2/10 ± 1) | 65 ± 2% $CHClF_2$•25 ± 2% $C_2HF_4Cl$•10 ± 1% $C_2H_3F_2Cl$ | FX-57[2] |
| HCFC | R-414B | R-/124/600a/142b (50 ± 2/39 ± 2/1.5 ± .5/9.5 ± .5-1) | 50 ± 2% $CHClF_2$•39 ± 2% $C_2HF_4Cl$•1.5 ± .5% $C_4H_{10}$•9.5 ± .5, −1% $C_2H_3F_2Cl$ | Hot Shot,[2][1] Kar Kool[2] |
| HCFC | R-414A | R-/124/600a/142b (51 ± 2/28.5 ± 2/4 ± .5/16.5 ± .5-1) | 51 ± 2% $CHClF_2$•28.5 ± 2% $C_2HF_4Cl$•4 ± .5% $C_4H_{10}$•16.5 ± .5, −1% $C_2H_3F_2Cl$ | GHG-X4,[2] Autofrost,[2] Chill-It[2] |
| HCFC | R-415B | R-/152a (25 ± 1/75 ± 1) | 25 ± 1% $CHClF_2$•75 ± 1% $C_2H_4F_2$ | |
| HCFC | R-415A | R-/152a (82 ± 1/18 ± 1) | 82 ± 1% $CHClF_2$•18 ± 1% $C_2H_4F_2$ | |
| HCFC | R-401C | R-/152a/124 (33 ± 2/15 + .5, −1.5/52 ± 1) | 33 ± 2% $CHClF_2$•15 + .5, −1.5% $C_2H_4F_2$•52 ± 1% $C_2HF_4Cl$ | MP-52[1] |
| HCFC | R-401A | R-/152a/124 (53 ± 2/13 + .5, −1.5/34 ± 1) | 53 ± 2% $CHClF_2$•13 + .5, −1.5% $C_2H_4F_2$•34 ± 1% $C_2HF_4Cl$ | MP-39[2][1] |
| HCFC | R-401B | R-/152a/124 (61 ± 2/11 + .5, −1.5/28 ± 1) | 61 ± 2% $CHClF_2$•11 + .5, −1.5% $C_2H_4F_2$•28 ± 1% $C_2HF_4Cl$ | MP-66[2][1] |
| HCFC | R-405A | R-/152a/142b/C318 (45 ± 0/7 ± 1/5.5 ± 1/42.5 ± 2) | 45 ± 0% $CHClF_2$•7 ± 1% $C_2H_4F_2$•5.5 ± 1% $C_2H_3F_2Cl$•42.5 ± 2% $C_4F_8$ | GREENCOOL G2015[2] |
| HCFC | R-509[A] | R-/218 (44/56) | 44% $CHClF_2$•56% $C_3F_8$ | Arcton TP5R2[2] |
| HCFC | R-412A | R-/218/142b (70 ± 2/5 ± 2/25 ± 1) | 70 ± 2% $CHClF_2$•5 ± 2% $C_3F_8$•25 ± 1% $C_2H_3F_2Cl$ | Arcton TP5R[2] |
| HCFC | R-406A | R-/600a/142b (55 ± 2/4 ± 1/41 ± 0) | 55 ± 2% $CHClF_2$•4 ± 1% $C_4H_{10}$•41 ± 0% $C_2H_3F_2Cl$ | GHG[2][1] |
| HCFC | R-406B | R-/600a/142b (65 ± 2/4 ± 1/31 ± 0) | 65 ± 2% $CHClF_2$•4 ± 1% $C_4H_{10}$•31 ± 0% $C_2H_3F_2Cl$ | GHG-HP[2] |
| HCFC | R-503 | R-/13 (40.1/59.9) | 40.1% $CHF_3$•59.9% $CClF_3$ | |
| HCFC | R-418A | R-0/22/152a (1.5 ± .5/96 ± 1/2.5 ± .5) | 1.5 ± .5% $C_3H_8$•96 ± 1% $CHClF_2$•2.5 ± .5% $C_2H_4F_2$ | ISCEON 69-L[2] |
| HCFC | R-403B | R-0/22/218 (5 + .2, −2/56 ± 2/39 ± 0) | 5 + .2, −2% $C_3H_8$•56 ± 2% $CHClF_2$•39 ± 0% $C_3F_8$ | ISCEON 69-L[2] |
| HCFC | R-403A | R-0/22/218 (5 + .2, −2/75 ± 2/20 ± 0) | 5 + .2, −2% $C_3H_8$•75 ± 2% $CHClF_2$•20 ± 0% $C_3F_8$ | ISCEON 69-S[2] |
| HCFC | R-506 | R-/114 (55.1/44.9) | 55.1% $CH_2FCl$•44.9% $C_2F_4Cl_2$ | |
| HCFC | R-504 | R-/115 (48.2/51.8) | 48.2% $CH_2F_2$•51.8% $C_2F_5Cl$ | |
| HCFC | R-232 | Tetrachlorodifluoropropane | $C_3H_2F_2Cl_4$ | 134237-39-1 |
| HCFC | R-241 | Tetrachlorofluoropropane | $C_3H_3FCl_4$ | 134190-49-1 |
| HCFC | R-223 | Tetrachlorotrifluoropropane | $C_3HF_3Cl_4$ | 134237-37-9 |
| HCFC | R-242 | Trichlorodifluoropropane | $C_3H_3F_2Cl_3$ | 134237-42-6 |
| HCFC | R-251 | Trichlorofluoropropane | $C_3H_4FCl_3$ | 134190-51-5 |
| HCFC | R-224 | Trichlorotetrafluoropropane | $C_3HF_4Cl_3$ | 134237-38-0 |
| HCFC | R-233 | Trichlorotrifluoropropane | $C_3H_2F_3Cl_3$ | 134237-40-4 |
| HCFO | R-1233zd | 1-Chloro-3,3,3-trifluoropropene | $C_3H_2ClF_3$ | 2730-43-0 |
| HCFO | R-411A | R-0/22/152a (1.5 + 0-1/87.5 + 2, −0/11 + 0, −1) | 1.5 + 0, −1% $C_3H_6$•87.5 + 2, −0% $CHClF_2$•11 + 0, −1% $C_2H_4F_2$ | GREENCOOL G2018a[2] |
| HCFO | R-411B | R-0/22/152a (3 + 0, −1/94 + 2, −0/3 + 0, −1) | 3 + 0, −1% $C_3H_6$•94 + 2, −0% $CHClF_2$•3 + 0, −1% $C_2H_4F_2$ | GREENCOOL G2018b[2] |
| HCFO | R-411C | R-0/22/152a (3 + 0, −1/95.5 + 2, −0/1.5 + 0, −1) | 3 + 0, −1% $C_3H_6$•95.5 + 2, −0% $CHClF_2$•1.5 + 0, −1% $C_2H_4F_2$ | GREENCOOL G2018c[2] |
| HCO | R-1140 | Chloroethylene (vinyl chloride) | $C_2H_3Cl$ | 75-01-4 |
| HCO | R-1130 | cis-1,2-Dichloroethylene | $C_2H_2Cl_2$ | 156-59-2 |
| HCO | R-1120 | Trichloroethylene (trielene) | $C_2HCl_3$ | 79-01-6 |
| HFC | R-329ccb | 1,1,1,2,2,3,3,4,4-Nonafluorobutane | $C_4HF_9$ | 375-17-7 |
| HFC | R-347ccd | 1,1,1,2,2,3,3-Heptafluorobutane | $C_4H_3F_7$ | 662-00-0 |
| HFC | R-236cb | 1,1,1,2,2,3-Hexafluoropropane | $C_3H_2F_6$ | 677-56-5 |
| HFC | R-227ea | 1,1,1,2,3,3,3-Heptafluoropropane | $C_3HF_7$ | 431-89-0 |
| HFC | R-236ea | 1,1,1,2,3,3-Hexafluoropropane | $C_3H_2F_6$ | 431-63-0 |
| HFC | R-338eea | 1,1,1,2,3,4,4,4-Octafluorobutane | $C_4H_2F_8$ | 75995-72-1 |
| HFC | R-245eb | 1,1,1,2,3-Pentafluoropropane | $C_3H_3F_5$ | 431-31-2 |
| HFC | R-134a | 1,1,1,2-Tetrafluoroethane | $C_2H_2F_4$ | 811-97-2 |
| HFC | R-236fa | 1,1,1,3,3,3-Hexafluoropropane | $C_3H_2F_6$ | 690-39-1 |
| HFC | R-365mfc | 1,1,1,3,3-Pentafluorobutane | $C_4H_5F_5$ | 406-58-6 |

TABLE 1-continued

| Type | ASHRAE Number | IUPAC Name | Molecular Formula | | CAS Number |
|---|---|---|---|---|---|
| HFC | R-245fa | 1,1,1,3,3-Pentafluoropropane | $C_3H_3F_5$ | | 460-73-1 |
| HFC | R-143a | 1,1,1-Trifluoroethane | $C_2H_3F_3$ | | 420-46-2 |
| HFC | R-ca | 1,1,2,2,3,3-Heptafluoropropane | $C_3HF_7$ | | 2252-84-8 |
| HFC | R-245ca | 1,1,2,2,3-Pentafluoropropane | $C_3H_3F_5$ | | 679-86-7 |
| HFC | R-134 | 1,1,2,2-Tetrafluoroethane | $C_2H_2F_4$ | | 359-35-3 |
| HFC | R-254cb | 1,1,2,2-Tetrafluoropropane | $C_3H_4F_4$ | | 40723-63-5 |
| HFC | R-245ea | 1,1,2,3,3-Pentafluoropropane | $C_3H_3F_5$ | | 24270-66-4 |
| HFC | R-143 | 1,1,2-Trifluoroethane | $C_2H_3F_3$ | | 430-66-0 |
| HFC | R-152a | 1,1-Difluoroethane | $C_2H_4F_2$ | | 75-37-6 |
| HFC | R-236me | 1,2,2,2-Tetrafluoroethyl difluoromethyl ether | $C_3H_2F_6O$ | | 57041-67-5 |
| HFC | R-152 | 1,2-Difluoroethane | $C_2H_4F_2$ | | 624-72-6 |
| HFC | R-E143a | 2,2,2-Trifluoroethyl methyl ether | $C_3H_5F_3O$ | | 460-43-5 |
| HFC | R-E134 | Bis(difluoromethyl)ether | $C_2H_2F_4O$ | | 1691-17-4 |
| HFC | R-32 | Difluoromethane | $CH_2F_2$ | | 75-10-5 |
| HFC | R-245qc | Difluoromethyl 1,1,2-trifluoroethyl ether | $C_3H_3F_5O$ | | 69948-24-9 |
| HFC | R-245mf | Difluoromethyl 2,2,2-trifluoroethyl ether | $C_3H_3F_5O$ | | 1885-48-9 |
| HFC | R-272 | Difluoropropane | $C_3H_6F_2$ | | |
| HFC | R-161 | Fluoroethane | $C_2H_5F$ | | 353-36-6 |
| HFC | R-41 | Fluoromethane | $CH_3F$ | | 593-53-3 |
| HFC | R-281 | Fruoropropane | $C_3H_7F$ | | |
| HFC | R-FE-36 | Hexafluoropropane | $C_3H_2F_6$ | | 359-58-0 |
| HFC | R-254pc | Methyl 1,1,2,2-tetrafluoroethyl ether | $C_3H_4F_4O$ | | 425-88-7 |
| HFC | R-245mc | Methyl pentafluoroethyl ether | $C_3H_3F_5O$ | | 22410-44-2 |
| HFC | R-143m | Methyl trifluoromethyl ether | $C_2H_3F_3O$ | | 421-14-7 |
| HFC | R-E125 | Pentafluorodimethyl ether | $C_2HF_5O$ | | 3822-68-2 |
| HFC | R-125 | Pentafluoroethane | $C_2HF_5$ | | 354-33-6 |
| HFC | R-245cb | Pentafluoropropane | $C_3H_3F_5$ | | 1814-88-6 |
| HFC | R-347mmy | Perfluoroisopropyl methyl ether | $C_4H_3F_7O$ | | 22052-84-2 |
| HFC | R-347mcc | Perfluoropropyl methyl ether | $C_4H_3F_7O$ | | 375-03-1 |
| HFC | R-421A | R-/134a (58 ± 1/42 ± 1) | 58 ± 1% $C_2HF_5$•42 ± 1% $C_2H_2F_4$ | | Choice R421A[1] |
| HFC | R-421B | R-/134a (85 ± 1/15 ± 1) | 85 ± 1% $C_2HF_5$•15 ± 1% $C_2H_2F_4$ | | Choice 421B[1] |
| HFC | R-417A | R-/134a/600 (46.6 ± 1.1/50 ± 1/3.4 + .1, −.4) | 46.6 ± 1.1% $C_2HF_5$•50 ± 1% $C_2H_2F_4$•3.4 + .1, −.4% $C_4H_{10}$ | | ISCEON 59,[2] NU-22[2] |
| HFC | R-417B | R-/134a/600 (79 ± 1/18.3 ± 1/2.7 + .1, −.5) | 79 ± 1% $C_2HF_5$•18.3 ± 1% $C_2H_2F_4$•2.7 + .1, −.5% $C_4H_{10}$ | | |
| HFC | R-437A | R-/134a/600/601 (19.5 + .5, −1.8/78.5 + 1.5, −.7/1.4 + .1, −.2/.6 + .1, −.2) | 19.5 + .5, −1.8% $C_2HF_5$•78.5 + 1.5, −.7% $C_2H_2F_4$•1.4 + .1, −.2% $C_4H_{10}$•.6 + .1, −.2% $C_5H_{12}$ | | |
| HFC | R-426A | R-/134a/600/601a (5.1 ± 1/93 ± 1/1.3 + .1, −.2/.6 + .1, −.2) | 5.1 ± 1% $C_2HF_5$•93 ± 1% $C_2H_2F_4$•1.3 + .1, −.2% $C_4H_{10}$•.6 + .1, −.2% $C_5H_{12}$ | | RS-24 (new comp.)[1] |
| HFC | R-422B | R-/134a/600a (55 ± 1/42 ± 1/3 ± .1, −.5) | 55 ± 1% $C_2HF_5$•42 ± 1% $C_2H_2F_4$•3 + .1, −.5% $C_4H_{10}$ | | ICOR XAC1[1] |
| HFC | R-422D | R-/134a/600a (65.1 + .9, −1.1/31.5 ± 1/3.4 + .1, −.4) | 65.1 + .9, −1.1% $C_2HF_5$•31.5 ± 1% $C_2H_2F_4$•3.4 + .1, −.4% $C_4H_{10}$ | | ISCEON MO29[1] |
| HFC | R-422C | R-/134a/600a (82 ± 1/15 ± 1/3 ± .1, −.5) | 82 ± 1% $C_2HF_5$•15 ± 1% $C_2H_2F_4$•3 + .1, −.5% $C_4H_{10}$ | | ICOR XLT1[1] |
| HFC | R-422A | R-/134a/600a (85.1 ± 1/11.5 ± 1/3.4 + .1, −.4) | 85.1 ± 1% $C_2HF_5$•11.5 ± 1% $C_2H_2F_4$•3.4 + .1, −.4% $C_4H_{10}$ | | ISCEON 79[1] |
| HFC | R-424A | R-/134a/600a/600/601a (50.5 ± 1/47 ± 1/1.9 + .1, −.2/1 + .1, +.2/.6 + .1, −.2) | 50.5 ± 1% $C_2HF_5$•47 ± 1% $C_2H_2F_4$•1.9 + .3, −.1% $C_4H_{10}$•.6 + .1, −.2% $C_5H_{12}$ | | RS-44 (new comp.)[1] |
| HFC | R-419A | R-/134a/E170 (77 ± 1/19 ± 1/4 ± 1) | 77 ± 1% $C_2HF_5$•19 ± 1% $C_2H_2F_4$•4 ± 1% $C_2H_6O$ | | |
| HFC | R-507[A] | R-/143a (50/50) | 50% $C_2HF_5$•50% $C_2H_3F_3$ | | AZ-50[2] |
| HFC | R-404A | R-/143a/134a (44 ± 2/52 ± 1/4 ± 2) | 44 ± 2% $C_2HF_5$•52 ± 1% $C_2H_3F_3$•4 ± 2% $C_2H_2F_4$ | | HP-62,[2][1] FX-70[2][1] |
| HFC | R-434A | R-/143a/134a/600a (63.2 ± 1/18 ± 1/16 ± 1/2.8 + .1, −.2) | 63.2 ± 1% $C_2HF_5$•18 ± 1% $C_2H_3F_3$•16 ± 1% $C_2H_2F_4$•2.8 + .1, −.2% $C_4H_{10}$ | | RS-45[1] |
| HFC | R-428A | R-/143a/290/600a (77.5 ± 1/20 ± 1/.6 + .1, −.2/1.9 + .1, −.2) | 77.5 ± 1% $C_2HF_5$•20 ± 1% $C_2H_3F_3$•.6 + .1, −.2% $C_3H_8$•1.9 + .1, −.2% $C_4H_{10}$ | | RS-52[1] |
| HFC | R-423A | R-a/227ea (52.5 ± 1/47.5 ± 1) | 52.5 ± 1% $C_2H_2F_4$•47.5 ± 1% $C_3HF_7$ | | |
| HFC | R-430A | R-a/600a (76 ± 1/24 ± 1) | 76 ± 1% $C_2H_4F_2$•24 ± 1% $C_4H_{10}$ | | |
| HFC | R-413A | R-/134a/600a (9 ± 1/88 ± 2/3 + 0, −1) | 9 ± 1% $C_3F_8$•88 ± 2% $C_2H_2F_4$•3 + 0, −1% $C_4H_{10}$ | | ISCEON 49[2] |
| HFC | R-508[A] | R-/116 (39/61) | 39% $CHF_3$•61% $C_2F_6$ | | Klea 5R3[2][1] |
| HFC | R-508B | R-/116 (46/54) | 46% $CHF_3$•54% $C_2F_6$ | | Suva 95[2][1] |
| HFC | R-440A | R-0/134a/152a (.6 ± .1/1.6 ± .6/97.8 ± .5) | .6 ± 1% $C_3H_8$•1.6 ± .6% $C_2H_2F_4$•97.8 ± .5% $C_2H_4F_2$ | | |
| HFC | R-431A | R-0/152a (71 ± 1/29 ± 1) | 71 ± 1% $C_3H_8$•29 ± 1% $C_2H_4F_2$ | | |
| HFC | R-410B | R-/125 (45 ± 1/55 ± 1) | 45 ± 1% $CH_2F_2$•55 ± 1% $C_2HF_5$ | | AC9100[1] |
| HFC | R-410A | R-/125 (50 + .5, −1.5/50 + 1.5, −.5) | 50 + .5, −1.5% $CH_2F_2$•50 + 1.5, −.5% $C_2HF_5$ | | AZ-20,[2] Puron,[2] Suva 9100[2] |
| HFC | R-407B | R-/125/134a (10 ± 2/70 ± 2/20 ± 2) | 10 ± 2% $CH_2F_2$•70 ± 2% $C_2HF_5$•20 ± 2% $C_2H_2F_4$ | | Klea 61[2] |
| HFC | R-407D | R-/125/134a (15 ± 2/15 ± 2/70 ± 2) | 15 ± 2% $CH_2F_2$•15 ± 2% $C_2HF_5$•70 ± 2% $C_2H_2F_4$ | | |
| HFC | R-407A | R-/125/134a (20 ± 2/40 ± 2/40 ± 2) | 20 ± 2% $CH_2F_2$•40 ± 2% $C_2HF_5$•40 ± 2% $C_2H_2F_4$ | | Klea 60[2][1] |
| HFC | R-407C | R-/125/134a (23 ± 2/25 ± 2/52 ± 2) | 23 ± 2% $CH_2F_2$•25 ± 2% $C_2HF_5$•52 ± 2% $C_2H_2F_4$ | | Klea 66,[2] AC9000[1] |
| HFC | R-407E | R-/125/134a (25 ± 2/15 ± 2/60 ± 2) | 25 ± 2% $CH_2F_2$•15 ± 2% $C_2HF_5$•60 ± 2% $C_2H_2F_4$ | | |
| HFC | R-407F | R-/125/134a (30 ± 2/30 ± 2/40 ± 2) | 30 ± 2% $CH_2F_2$•30 ± 2% $C_2HF_5$•40 ± 2% $C_2H_2F_4$ | | Genetron Performax LT[1] |

TABLE 1-continued

| Type | ASHRAE Number | IUPAC Name | Molecular Formula | CAS Number |
|---|---|---|---|---|
| HFC | R-438A | R-/125/134a/600/601a (8.5 + .5, −1.5/45 ± 1.5/44.2 ± 1.5/1.7 + .1, −.2/.6 + .1, −.2) | 8.5 + .5, −1.5% $CH_2F_2$•45 ± 1.5% $C_2HF_5$•44.2 ± 1.5% $C_2H_2F_4$•1.7 + .1, −.2% $C_4H_{10}$•.6 + .1, −.2% $C_5H_{12}$ | KDD5,[1] ISCEON MO99[1] |
| HFC | R-427A | R-/125/143a/134a (15 ± 2/25 ± 2/10 ± 2/50 ± 2) | 15 ± 2% $CH_2F_2$•25 ± 2% $C_2HF_5$•10 ± 2% $C_2H_3F_3$•50 ± 2% $C_2H_2F_4$ | Forane 427A[1] |
| HFC | R-439a | R-/125/600a (50 ± 1/47 ± 1/3 ± .5) | 50 ± 1% $CH_2F_2$•47 ± 1% $C_2HF_5$•3 ± .5% $C_4H_{10}$ | |
| HFC | R-425A | R-/134a/227ea (18.5 ± .5/69.5 ± .5/12 ± .5) | 18.5 ± .5% $CH_2F_2$•69.5 ± .5% $C_2H_2F_4$•12 ± .5% $C_3HF_7$ | |
| HFC | R-435A | R-E170/152a (80 ± 1/20 ± 1) | 80 ± 1% $C_2H_6O$•20 ± 1% $C_2H_4F_2$ | |
| HFC | R-429A | R-E170/152a/600a (60 ± 1/10 ± 1/30 ± 1) | 60 ± 1% $C_2H_6O$•10 ± 1% $C_2H_4F_2$•30 ± 1% $C_4H_{10}$ | |
| HFC | R-23 | Trifluoromethane (Fluoroform) | $CHF_3$ | 75-46-7 |
| HFC | R-227ca2 | Trifluoromethyl 1,1,2,2-tetrafluoroethyl ether | $C_3HF_7O$ | 2356-61-8 |
| HFC | R-227me | Trifluoromethyl 1,2,2,2-tetrafluoroethyl ether | $C_3HF_7O$ | 2356-62-9 |
| HFC | R-263 | Trifluoropropane | $C_3H_5F_3$ | |
| HFO | R-1132a | 1,1-Difluoroethylene | $C_2H_2F_2$ | 75-38-7 |
| HFO | R-1234ze | 1,3,3,3-Tetrafluoropropene | $C_3H_2F_4$ | 1645-83-6 |
| HFO | R-1234yf | 2,3,3,3-Tetrafluoropropene | $C_3H_2F_4$ | 754-12-1 |
| HFO | R-1141 | Fluoroethylene (vinyl fluoride) | $C_2H_3F$ | 75-02-5 |
| PCC | R-10 | Carbon tetrachloride (Tetrachloromethane) | $CCl_4$ | 56-23-5 |
| PCC | R-110 | Hexachloroethane | $C_2Cl_6$ | 67-72-1 |

[1]Composition of Refrigerant Blends, www.epa.gov/ozone/snap/refrigerants/refblend.html
[2]Andy's HVAC/R Web Page, users.isp.com/aschoen/refchart.pdf

What is claimed is:

1. A method for retrofitting a refrigeration system from an HCFC refrigerant compatible with a mineral oil or alkyl benzene lubricant to an HFC refrigerant compatible with a polyol ester lubricant, comprising:
    evacuating the HCFC from the refrigeration system, leaving at least a portion of the mineral oil or alkyl benzene lubricant; and
    charging the refrigeration system with a composition comprising the HFC refrigerant mixed with a polyol ester lubricant,
    thereby resulting in a refrigeration system charged with the HFC and a mixed lubricant comprising both the mineral oil or alkyl benzene lubricant and the polyol ester lubricant.

2. The method according to claim 1,
wherein the refrigeration system comprises a hermetically sealed refrigeration system, further comprising:
providing a transport container containing the HFC refrigerant mixed with the polyol ester lubricant; and
said evacuating comprises withdrawing the HCFC from within the refrigeration system through a charge-discharge port, leaving at least a portion of the mineral oil or alkyl benzene lubricant.

3. The method according to claim 1, wherein the mineral oil or alkyl benzene lubricant is a mineral oil lubricant.

4. The method according to claim 1, wherein the HCFC comprises R-22, and the HFC comprises R-407C.

5. The method according to claim 1, wherein the polyol ester is provided in an amount of 5% to 15% by weight.

6. The method according to claim 1, wherein the polyol ester is provided in an amount of 8% by weight.

7. The method according to claim 1, wherein the refrigeration system after recharging has a concentration of 15-32% by weight mixed lubricant.

8. The method according to claim 1, wherein the transport container is U.S. Department of Transportation compliant.

9. The method according to claim 1, wherein the transport container is compliant at least one of U.S. Department of Transportation standards DOT-39, DOT 3, DOT 3A, DOT 3AA, DOT 3AL, DOT 3B, DOT 3BN, DOT 3E, DOT 4B, DOT 4BA, DOT 4B240ET, DOT 4BW, DOT 4E, DOT 3AL1800; DOT 4D; DOT-3A1000; DOT-3A1200; DOT-3A150; DOT-3A1800; DOT-3A2000; DOT-3A225; DOT-3A240; DOT-3A2400; DOT-3A300; DOT-3A400; DOT-3A480; DOT-3A480X; DOT-3AA; DOT-3AA1000; DOT-3AA1200; DOT-3AA150; DOT-3AA1800; DOT-3AA2000; DOT-3AA225; DOT-3AA240; DOT-3AA2400; DOT-3AA300; DOT-3AA400; DOT-3AA480; DOT-3AAX1800; DOT-3AAX2000; DOT-3AAX2200; DOT-3AAX2400; DOT-3AL; DOT-3AL1000; DOT-3AL150; DOT-3AL1800; DOT-3AL2000; DOT-3AL225; DOT-3AL240; DOT-3AL2400; DOT-3AL400; DOT-3AL480; DOT-3AX1800; DOT-3AX2000; DOT-3AX2200; DOT-3AX2400; DOT-3B; DOT-3B150; DOT-3B1800; DOT-3B225; DOT-3B240; DOT-3B300; DOT-3B400; DOT-3BN400; DOT-3BN480; DOT-3E1800; DOT-3HT; DOT-3HT2000; DOT-3T1800; DOT-3T2000; DOT-3T2200; DOT-3T2400; DOT-4A; DOT-4AA480; DOT-4B; DOT-4B150; DOT-4B150; DOT-4B225; DOT-4B240; DOT-4B240ET; DOT-4B300; DOT-4B400; DOT-4B480; DOT-4BA; DOT-4BA225; DOT-4BA240; DOT-4BA300; DOT-4BA400; DOT-4BW225; DOT-4BW240; DOT-4BW300; DOT-4BW400; DOT-4BW480; DOT-4DA; DOT-4DS; DOT-4E225; DOT-4E240; DOT-4L; DOT-AAX2400; and ICC-3E1800.

10. The method according to claim 1, wherein the HFC refrigerant is a blend of difluoromethane (R-32), pentafluoroethane (R-125), and 1,1,1,2-tetrafluoroethane (R-134a).

11. The method according to claim 10, wherein the HFC is R-407C, and the polyol ester lubricant is premixed with the HFC refrigerant in an amount of 8% by weight.

12. The method according to claim 10, wherein the system after charging has a concentration of 20-25% by weight lubricant mixture.

13. The method according to claim 10, wherein the HFC refrigerant mixed with the polyol ester lubricant is provided in a U.S. Department of Transportation compliant transport container having a capacity of 50 pounds or lower.

14. A method for retrofitting an HCFC refrigeration system having a mineral oil or alkyl benzene lubricant, which persists as a residual after removal of the HCFC from the refrigeration system by evacuation, to an HFC refrigerant which is not compatible with the HFC refrigerant as a sole lubricant, comprising:

providing a container adapted for common carrier transport, containing a composition comprising an HFC refrigerant mixed with a compatible polyol ester lubricant;

evacuating the HCFC from the refrigeration system, leaving at least a portion of the mineral oil or alkyl benzene lubricant within the refrigeration system; and charging the refrigeration system with the composition from the container, comprising the HFC refrigerant mixed with the compatible polyol ester lubricant, to thereby provide the refrigeration system charged with the HFC and a combination of the mineral oil or alkyl benzene lubricant and the HFC refrigerant.

15. The method according to claim 14, wherein:
the HCFC comprises R-22;
the container comprises a U.S. Department of Transportation certified transport container; and
the HFC is R-407C.

16. The method according to claim 14, wherein the polyol ester lubricant is present in the container an amount of 5% to 15% by weight and the HFC refrigerant is present in an amount of 95-85% by weight.

17. The method according to claim 14, wherein the polyol ester lubricant is present in the container an amount of 8% by weight and the HFC refrigerant is present in an amount of 92% by weight.

18. The method according to claim 14, wherein the HFC is selected from the group consisting of R-134a, R-404A, R-407A, R-407C, R-407F, R-410A, R-417A, R-417B, R-422A, R-422B, R-422C, R-422D, R-424A, R-427A, R-428A, R-434A, R-438A, R-442A, and RS07A.

19. The method according to claim 14, wherein the transport container is DOT-39 compliant.

20. A method for retrofitting a refrigeration system from an HCFC refrigerant compatible with a mineral oil or alkyl benzene lubricant to 407C premixed with a compatible polyol ester lubricant in an amount of between 5%-20% by weight of the refrigerant, comprising:

providing a mixture of the 407C premixed with the compatible polyol ester lubricant to the refrigeration system in a U.S. Department of Transportation compliant transport container having a capacity of 50 pounds or lower;

evacuating the HCFC from the refrigeration system through a charge-discharge port of the refrigeration system, without draining the mineral oil or alkyl benzene lubricant, and leaving at least a portion of the mineral oil or alkyl benzene lubricant in the refrigeration system; and charging the refrigeration system with the mixture from the container of the 407C premixed with the compatible polyol ester lubricant, thereby resulting in the refrigeration system charged with the 407C and a mixed lubricant comprising both the mineral oil or alkyl benzene lubricant and the compatible polyol ester lubricant, wherein the mixed lubricant is present in the refrigeration system in an amount of 16% to 32% by weight of the refrigerant charge, and the compatible polyol ester lubricant is present in the refrigeration system an amount of 25% to 50% by weight of the mixed lubricant.

* * * * *